(12) United States Patent
You et al.

(10) Patent No.: US 12,279,128 B2
(45) Date of Patent: Apr. 15, 2025

(54) COMMUNICATION METHOD, RESOURCE ALLOCATION METHOD, AND APPARATUS

(71) Applicant: HUAWEI TECHNOLOGIES CO., LTD., Guangdong (CN)

(72) Inventors: Chunhua You, Shanghai (CN); Qiang Fan, Hefei (CN); Xing Liu, Shenzhen (CN); Jun Wang, Shanghai (CN); Yibin Zhuo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 663 days.

(21) Appl. No.: 17/197,920

(22) Filed: Mar. 10, 2021

(65) Prior Publication Data
US 2021/0195430 A1    Jun. 24, 2021

Related U.S. Application Data

(63) Continuation of application No. PCT/CN2019/100007, filed on Aug. 9, 2019.

(30) Foreign Application Priority Data

Sep. 11, 2018  (CN) .................. 201811057265.X

(51) Int. Cl.
H04W 74/04 (2009.01)
H04W 16/14 (2009.01)
(Continued)

(52) U.S. Cl.
CPC .......... *H04W 16/14* (2013.01); *H04W 72/04* (2013.01); *H04W 74/002* (2013.01)

(58) Field of Classification Search
CPC .... H04W 16/14; H04W 72/04; H04W 72/002
See application file for complete search history.

(56) References Cited

U.S. PATENT DOCUMENTS

2005/0096064 A1   5/2005  Hunzinger
2013/0324114 A1  12/2013  Raghothaman et al.
(Continued)

FOREIGN PATENT DOCUMENTS

CN    103974440 A    8/2014
CN    105101439 A   11/2015
(Continued)

OTHER PUBLICATIONS

"3rd Generation Partnership Project; Technical Specification Group Radio Access Network; V2X Services based on LTE sidelink; User Equipment (UE) radio transmission and reception (Release 14)",3GPP Standard ; Technical Report; 3GPP TR 36.786,V1.0.0, Mar. 6, 2017, pp. 1-71.

(Continued)

*Primary Examiner* — Sulaiman Nooristany
(74) *Attorney, Agent, or Firm* — WOMBLE BOND DICKINSON (US) LLP

(57) ABSTRACT

A first terminal obtains a first transmission resource that is sent by an access network device and that is used by the first terminal to send data on a sidelink, where the sidelink is a wireless communication link between the first terminal and a second terminal, and the first transmission resource is a resource of an unlicensed spectrum. The first terminal performs a channel access procedure on the unlicensed spectrum. The first terminal sends first information to the access network device when the first terminal determines that a failure occurs in the channel access procedure performed on the unlicensed spectrum, where the first information is used to request to allocate a second transmission resource to the sidelink of the unlicensed spectrum.

10 Claims, 12 Drawing Sheets

(51) Int. Cl.
*H04W 72/04* (2023.01)
*H04W 74/00* (2009.01)

(56) References Cited

U.S. PATENT DOCUMENTS

| | | | | |
|---|---|---|---|---|
| 2015/0139176 | A1* | 5/2015 | Morita | H04L 5/0055 |
| | | | | 370/330 |
| 2015/0195865 | A1 | 7/2015 | Lee et al. | |
| 2017/0006599 | A1 | 1/2017 | Dinan | |
| 2017/0230939 | A1 | 8/2017 | Rudolf et al. | |
| 2018/0368090 | A1* | 12/2018 | Kadambar | H04W 8/005 |
| 2019/0254059 | A1* | 8/2019 | Gulati | H04W 72/542 |
| 2021/0235500 | A1* | 7/2021 | Hong | H04W 74/0825 |

FOREIGN PATENT DOCUMENTS

| | | |
|---|---|---|
| CN | 106304345 A | 1/2017 |
| CN | 106535332 A | 3/2017 |
| CN | 107295677 A | 10/2017 |
| CN | 107548070 A | 1/2018 |
| CN | 107926045 A | 4/2018 |
| CN | 108476532 A | 8/2018 |
| EP | 2861009 A1 | 4/2015 |
| EP | 2887756 A1 | 6/2015 |
| WO | 2017125049 A1 | 7/2017 |
| WO | 2018059700 A1 | 4/2018 |

OTHER PUBLICATIONS

3GPP TSG RAN WG1 Meeting #94,R1-1808696,Sidelink Resource Allocation Mechanisms for NR V2X Communication,Intel Corporation,Gothenburg, Sweden, Aug. 20-24, 2018,total 13 pages.
3GPP TSG RAN WG1 Meeting #94 ,R1-1808939,UE autonomous sidelink allocation for NR V2X, Huawei, HiSilicon, Gothenburg, Sweden, Aug. 20-24, 2018,total 5 pages.
3GPP TSG-RAN WG2 #93, Tdoc R2-161566, Sidelink Resource Allocation in V2X ,Ericsson,Malta, 15 Feb. 19, 2016,total 10 pages.
Ericsson Sidelink Resource Allocation in V2X 3GPP TSG-RANWG2 #93 Tdoc R2-161566 ,Feb. 19, 2016,total 10 pages.

* cited by examiner

COMMUNICATION METHOD, RESOURCE ALLOCATION METHOD, AND APPARATUS

CROSS-REFERENCE TO RELATED APPLICATIONS

This application is a continuation of International Application No. PCT/CN2019/100007, filed on Aug. 9, 2019, which claims priority to Chinese Patent Application No. 201811057265.X, filed on Sep. 11, 2018. The disclosures of the aforementioned applications are herein incorporated by reference in their entireties.

TECHNICAL FIELD

Embodiments of this application relate to the field of communications technologies, and in particular, to a communication method, a resource allocation method, and an apparatus.

BACKGROUND

Spectrum resources are classified into a licensed spectrum and an unlicensed spectrum. The licensed spectrum may be used by some organizations or operators. The unlicensed spectrum is a shared spectrum and can be used by different operators or organizations. Therefore, to fairly use the unlicensed spectrum, before sending data, a terminal and an access network device need to perform a listen-before-talk (LBT) channel access procedure. If the LBT channel access procedure is not completed, the terminal and the access network device cannot send the data by using the unlicensed spectrum. If the LBT channel access procedure is completed, the terminal and the access network device may send the data by using the unlicensed spectrum.

At present, the LBT channel access procedure includes an energy detection based on fixed duration and an energy detection based on a back-off mechanism. For the energy detection based on the fixed duration, if the terminal or the access network device determines that a signal energy detected in the fixed duration is less than a preset threshold, it is considered that a channel is idle; otherwise, the terminal or the access network device determines that the channel is busy. For the energy detection based on the back-off mechanism, the terminal and the access network device randomly select a value A from a range window. When detecting at least A times of idle energy detections that are based on the fixed duration, the terminal or the access network device determines that a channel is idle. When the channel is idle, the data can be sent. Otherwise, the data cannot be sent.

At present, in the prior art, regardless of whether a terminal successfully performs LBT, if an access network device cannot parse data sent by the terminal, the access network device sends a retransmission indication to the terminal, to indicate the terminal to resend the data. However, the access network device is not sure of a reason why the terminal fails to send the data. In addition, in the prior art, no record of how the terminal sends the data to another terminal on a sidelink by using a transmission resource of the unlicensed spectrum is provided.

SUMMARY

Embodiments of this application provide a communication method, a resource allocation method, and an apparatus, to resolve a problem of sending data between terminals on an unlicensed spectrum resource.

To resolve the foregoing technical problem, the embodiments of this application provide the following technical solutions:

According to a first aspect, this application provides a communication method. The method includes: obtaining, by a first terminal, indication information that is sent by an access network device and that is of a first transmission resource used by the first terminal to send data on a sidelink, where the sidelink is a wireless communication link between the first terminal and a second terminal, and the first transmission resource is a resource of an unlicensed spectrum; performing, by the first terminal, a channel access procedure on the unlicensed spectrum; and sending, by the first terminal, first information to the access network device when the first terminal determines that a failure occurs in the channel access procedure performed on the unlicensed spectrum, where the first information is used to request to allocate a second transmission resource to the sidelink of the unlicensed spectrum.

In the communication method provided in this embodiment of this application, the first terminal obtains the first transmission resource, and then performs the channel access procedure on the unlicensed spectrum to which the first transmission resource belongs. When the failure occurs in the channel access procedure, the first terminal cannot send the data to the second terminal on the first transmission resource. Therefore, to ensure that the first terminal can communicate with the second terminal on the unlicensed spectrum, the first terminal sends the first information to the access network device, to request the access network device to allocate the second transmission resource again to the sidelink of the unlicensed spectrum. In this way, the first terminal subsequently sends the data to the second terminal on the sidelink by using the requested second transmission resource.

In one embodiment, the second transmission resource is associated with information about the unlicensed spectrum, or the second transmission resource is associated with information about a channel on which the failure occurs in the channel access procedure and that is of one or more channels associated with the unlicensed spectrum. In this way, after receiving the first information, the access network device determines an unlicensed spectrum to which the requested second transmission resource belongs.

In one embodiment, the sending, by the first terminal, first information to the access network device when the first terminal determines that a failure occurs in the channel access procedure performed on the unlicensed spectrum includes: sending, by the first terminal, the first information to the access network device by using a communication resource corresponding to the first transmission resource when the first terminal determines that the failure occurs in the channel access procedure performed on the unlicensed spectrum, so that the access network device determines, based on a resource for receiving the first information, that the failure occurs in the channel access procedure performed on the unlicensed spectrum associated with the resource for receiving the first information.

In one embodiment, the sending, by the first terminal, first information to the access network device when the first terminal determines that a failure occurs in the channel access procedure performed on the unlicensed spectrum includes: sending, by the first terminal, the first information to the access network device by using a communication resource associated with the channel on which the failure occurs in the channel access procedure of the unlicensed spectrum when the first terminal determines that the failure occurs in the channel access procedure performed on the unlicensed spectrum.

In one embodiment, that the first terminal determines that a failure occurs in the channel access procedure performed on the unlicensed spectrum includes: determining, by the first terminal, that the failure occurs in the channel access procedure performed on one channel of the one or more channels associated with the unlicensed spectrum, and determining, by the first terminal, that the failure occurs in the channel access procedure performed on the unlicensed spectrum. This is because the first transmission resource allocated by the access network device to the first terminal may be dynamically configured. Therefore, as long as the first terminal determines that one failure occurs in the channel access procedure, the first terminal may determine that the failure occurs in the channel access procedure performed on the unlicensed spectrum.

In one embodiment, that the first terminal determines that a failure occurs in the channel access procedure performed on the unlicensed spectrum includes: determining, by the first terminal, that a quantity of times that the failure occurs in the channel access procedure on one channel of the one or more channels associated with the unlicensed spectrum is greater than a first threshold, and determining, by the first terminal, that the failure occurs in the channel access procedure performed on the unlicensed spectrum. The second transmission resource allocated by the access network device to the first terminal may be semi-persistently configured, or the first transmission resource configured for the first terminal is a periodic first transmission resource. Therefore, if the first terminal determines that a quantity of times that the failure occurs in the channel access procedure is greater than the first threshold, the first terminal may determine that the failure occurs in the channel access procedure performed on the unlicensed spectrum.

In one embodiment, the first information includes one or both of the information about the unlicensed spectrum and the information about the channel on which the failure occurs in the channel access procedure. In this case, after receiving the first information, the access network device may determine, based on content of the first information, the unlicensed spectrum on which the failure occurs in the channel access procedure.

In one embodiment, the method provided in this embodiment of this application further includes: obtaining, by the first terminal, a channel access priority class; and the performing, by the first terminal, a channel access procedure on the unlicensed spectrum includes: performing, by the first terminal, the channel access procedure on the unlicensed spectrum based on a channel access parameter corresponding to the channel access priority class. This is because different channel access priority classes may correspond to different channel access parameters. Therefore, the channel access procedure may be performed based on the channel access parameter corresponding to the determined channel access priority class.

In one embodiment, the obtaining, by the first terminal, a channel access priority class includes: receiving, by the first terminal, the channel access priority class sent by the access network device; or determining, by the first terminal, the channel access priority class based on service information of the data transmitted on the first transmission resource and a mapping relationship, where the mapping relationship includes one or more pieces of service information and a channel access priority class corresponding to each piece of service information in the one or more pieces of service information, and different channel access priority classes correspond to different channel access parameters. This is because different service information may have different requirements for channel access parameters. Therefore, determining the channel access priority class in combination of the service information can better adapt to a requirement of the service information in the channel access procedure.

In one embodiment, the service information includes one or more of the following: a ProSe per-packet priority (PPPP), a ProSe per-packet reliability (PPPR), a logical channel group (LCG), or a quality of service flow identifier (QFI).

In one embodiment, the method provided in this embodiment of this application further includes: obtaining, by the first terminal, a first communication resource that is sent by the access network device and that is used by the first terminal to send information on a transmission link, where the transmission link is a wireless communication link between the first terminal and the access network device, and the first communication resource is associated with the unlicensed spectrum on which the failure occurs in the channel access procedure or is associated with the channel on which the failure occurs in the channel access procedure. In this way, the first terminal can determine the unlicensed spectrum on which the failure occurs in the channel access procedure or the first communication resource that associated with the channel again, to subsequently send the information to the access network device by using the first communication resource.

According to a second aspect, this application provides a communication method. The method includes: obtaining, by a first terminal, indication information that is sent by an access network device and that is of a first transmission resource used by the first terminal to send data on a sidelink, where the sidelink is a wireless communication link between the first terminal and a second terminal, and the first transmission resource is a resource of an unlicensed spectrum; determining, by the first terminal, that the second terminal fails to parse a transport block sent by the first terminal on the first transmission resource; and sending, by the first terminal, first information to the access network device, where the first information is used to request to allocate the first transmission resource again.

In one embodiment, the determining, by the first terminal, that the second terminal fails to parse a transport block sent by the first terminal on the first transmission resource includes: receiving, by the first terminal, second information sent by the second terminal, where the second information includes one or more of the following: identifier information of the first terminal, hybrid automatic repeat request (HARQ) process identifier information, carrier identifier information, or transport block size information; and determining, by the first terminal based on the second information, that the second terminal fails to parse the transport block sent by the first terminal on the first transmission resource.

In one embodiment, the method provided in this embodiment of this application further includes: determining, by the first terminal, that the second terminal successfully parses the transport block sent by the first terminal on the first transmission resource, and sending, by the first terminal, a third request to the access network device, where the third request is used to request to allocate a second transmission resource to the first terminal on the sidelink, and the second transmission resource is used for new transmission.

In one embodiment, the determining, by the first terminal, that the second terminal successfully parses the transport block sent by the first terminal on the first transmission resource includes: receiving, by the first terminal, a fourth request sent by the second terminal, where the fourth request is used to indicate that the second terminal successfully parses the transport block sent by the first terminal on the first transmission resource.

According to a third aspect, this application provides a resource allocation method. The method includes: sending, by an access network device to a first terminal, indication information of a first transmission resource used by the first terminal to send data on a sidelink, where the sidelink is a wireless communication link between the first terminal and a second terminal, and the first transmission resource is a resource of an unlicensed spectrum; receiving, by the access network device, first information used to request to allocate a second transmission resource to the sidelink of the unlicensed spectrum; and allocating, by the access network device, the second transmission resource to the first terminal on the sidelink of the unlicensed spectrum based on the first information.

In one embodiment, the allocating, by the access network device, the second transmission resource to the first terminal on the sidelink of the unlicensed spectrum based on the first information includes: allocating, by the access network device, the second transmission resource to the first terminal on the sidelink of the unlicensed spectrum when the access network device determines, based on the first information, that a failure occurs in a channel access procedure performed on the unlicensed spectrum. It may be understood that when the access network device determines that the failure occurs in the channel access procedure performed on the unlicensed spectrum, the second transmission resource allocated to the first terminal is used for retransmission.

In one embodiment, that the access network device determines, based on the first information, that a failure occurs in a channel access procedure performed on the unlicensed spectrum includes: determining, by the access network device, that the second transmission resource is associated with information about the unlicensed spectrum, and determining, by the access network device, that the failure occurs in the channel access procedure performed on the unlicensed spectrum indicated by the information about the unlicensed spectrum.

In one embodiment, that the access network device determines, based on the first information, that a failure occurs in a channel access procedure performed on the unlicensed spectrum includes: determining, by the access network device, that the second transmission resource is associated with information about a channel on which the failure occurs in the channel access procedure, and determining, by the access network device, that the failure occurs in the channel access procedure performed on the unlicensed spectrum associated with the information about the channel on which the failure occurs in the channel access procedure.

In one embodiment, that the access network device determines, based on the first information, that a failure occurs in a channel access procedure performed on the unlicensed spectrum includes: determining, by the access network device, that the first information is received on a communication resource corresponding to the first transmission resource, and determining, by the access network device, that the failure occurs in a channel access procedure performed on the unlicensed spectrum.

In one embodiment, that the access network device determines, based on the first information, that a failure occurs in a channel access procedure performed on the unlicensed spectrum includes: determining, by the access network device, that the first information is received on a resource associated with a first channel, and determining, by the access network device, that the failure occurs in the channel access procedure performed on the unlicensed spectrum.

In one embodiment, the first information includes at least one of the information about the unlicensed spectrum and the information about the channel on which the failure occurs in the channel access procedure; and the access network device determines, based on the at least one of the information about the unlicensed spectrum and the information about the channel on which the failure occurs in the channel access procedure, that the failure occurs in the channel access procedure performed on the unlicensed spectrum.

In one embodiment, the method provided in this embodiment of this application further includes: sending, by the access network device to the first terminal, a first communication resource used by the first terminal to send information on a transmission link when the access network device determines that the failure occurs in the channel access procedure performed on the unlicensed spectrum, where the transmission link is a wireless communication link between the first terminal and the access network device, and the first communication resource is associated with the unlicensed spectrum on which the failure occurs in the channel access procedure performed or is associated with the channel on which the failure occurs in the channel access procedure performed.

In one embodiment, the method provided in this embodiment of this application further includes: allocating, by the access network device, the second transmission resource to the first terminal on the sidelink when the access network device determines, based on the first information, that a success occurs in the channel access procedure performed on the unlicensed spectrum, where when the access network device determines that the success occurs in the channel access procedure, the second transmission resource allocated by the access network device to the first terminal is used for new transmission.

Specifically, for a manner in which the access network device determines that the success occurs in the channel access procedure, refer to a manner in which the failure occurs in the channel access. Details are not described herein.

In one embodiment, the allocating, by the access network device, the second transmission resource to the first terminal on the sidelink of the unlicensed spectrum based on the first information includes: determining, by the access network device based on the first information, that the second terminal fails to parse a transport block sent by the first terminal on the first transmission resource, and allocating the second transmission resource to the first terminal on the sidelink of the unlicensed spectrum.

In one embodiment, the first information includes one or more of the following: identifier information of the first terminal, hybrid automatic repeat request HARQ process identifier information, carrier identifier information, or transport block size information.

In one embodiment, the allocating, by the access network device, the second transmission resource to the first terminal on the sidelink of the unlicensed spectrum based on the first information includes: determining, by the access network device based on the first information, that the second terminal successfully parses the transport block sent by the first terminal on the first transmission resource, and allocating the second transmission resource to the first terminal on the sidelink of the unlicensed spectrum, where when the access network device determines that the second terminal successfully parses the transport block sent by the first terminal on the first transmission resource, the second transmission resource allocated to the first terminal is used for new transmission.

According to a fourth aspect, this application provides a communications apparatus. The communications apparatus can implement the method in any one of the first aspect or the embodiments of the first aspect, and therefore can further implement beneficial effects in any one of the first aspect or the embodiments of the first aspect. The communications apparatus may be a first terminal, or may be an apparatus that can support a first terminal in implementing the method in any one of the first aspect or the possible implementations of the first aspect, for example, a chip used in the first terminal. The communications apparatus may implement the foregoing method by using software, hardware, or hardware executing corresponding software.

In one embodiment, the communications apparatus includes: an obtaining unit, configured to obtain indication information that is sent by an access network device and that is of a first transmission resource used by the first terminal to send data on a sidelink, where the sidelink is a wireless communication link between the first terminal and a second terminal, and the first transmission resource is a resource of an unlicensed spectrum; a processing unit, configured to perform a channel access procedure on the unlicensed spectrum; and a sending unit, configured to send first information to the access network device when the processing unit determines that a failure occurs in the channel access procedure performed on the unlicensed spectrum, where the first information is used to request to allocate a second transmission resource to the sidelink of the unlicensed spectrum.

In one embodiment, the second transmission resource is associated with information about the unlicensed spectrum, or the second transmission resource is associated with information about a channel on which the failure occurs in the channel access procedure and that is in one or more channels (channel) associated with the unlicensed spectrum.

In one embodiment, the sending unit is configured to send the first information to the access network device by using a communication resource corresponding to the first transmission resource when the processing unit determines that the failure occurs in the channel access procedure performed on the unlicensed spectrum.

In one embodiment, the sending unit is configured to send the first information to the access network device by using a communication resource associated with the channel on which the failure occurs in the channel access procedure of the unlicensed spectrum when the processing unit determines that the failure occurs in the channel access procedure performed on the unlicensed spectrum.

In one embodiment, the processing unit is configured to: determine that the failure occurs in the channel access procedure performed on one channel of the one or more channels associated with the unlicensed spectrum, and determine that the failure occurs in the channel access procedure performed on the unlicensed spectrum.

In one embodiment, the processing unit is configured to: determine that a quantity of times that the failure occurs in the channel access procedure on one channel of the one or more channels associated with the unlicensed spectrum is greater than a first threshold, and determine that the failure occurs in the channel access procedure performed on the unlicensed spectrum.

In one embodiment, the first information includes one or both of the information about the unlicensed spectrum or the information about the channel on which the failure occurs in the channel access procedure.

In one embodiment, the obtaining unit is further configured to obtain a channel access priority class; and the processing unit is configured to perform the channel access procedure on the unlicensed spectrum based on a channel access parameter corresponding to the channel access priority class.

In one embodiment, the obtaining unit is further configured to obtain the channel access priority class from the access network device; or the obtaining unit is further configured to determine the channel access priority class based on service information of the data transmitted on the first transmission resource and a mapping relationship, where the mapping relationship includes one or more pieces of service information and a channel access priority class corresponding to each piece of service information in the one or more pieces of service information, and different channel access priority classes correspond to different channel access parameters.

In one embodiment, the service information includes one or more of the following: a ProSe per-packet priority (PPPP), a ProSe per-packet reliability (PPPR), a logical channel group (LCG), or a quality of service flow identifier (QFI).

In one embodiment, the obtaining unit is further configured to obtain a first communication resource that is sent by the access network device and that is used by the first terminal to send information on a transmission link, where the transmission link is a wireless communication link between the first terminal and the access network device, and the first communication resource is associated with the unlicensed spectrum on which the failure occurs in the channel access procedure or is associated with the channel on which the failure occurs in the channel access procedure.

In another embodiment, this application further provides a communications apparatus. The communications apparatus may be a first terminal or a chip used in a first terminal. The communications apparatus includes a processor and an interface circuit. The interface circuit is configured to support the communications apparatus in performing the operations of receiving and sending a message/data on a communications apparatus side described in any one of the first aspect or the possible implementations of the first aspect. The processor is configured to support the communications apparatus in performing the operations of processing the message/data on the communications apparatus side in any one of the first aspect or the possible implementations of the first aspect. For specific corresponding operations, refer to the descriptions in any one of the first aspect or the possible implementations of the first aspect. Details are not described herein again in this embodiment of this application.

In one embodiment, the processor is configured to obtain indication information that is sent by an access network device and that is of a first transmission resource used by the first terminal to send data on a sidelink, where the sidelink is a wireless communication link between the first terminal and a second terminal, and the first transmission resource is a resource of an unlicensed spectrum. The processor is configured to perform a channel access procedure on the unlicensed spectrum. The interface circuit is configured to send first information to the access network device when the processing unit determines that a failure occurs in the channel access procedure performed on the unlicensed spectrum, where the first information is used to request to allocate a second transmission resource to the sidelink of the unlicensed spectrum.

In one embodiment, the second transmission resource is associated with information about the unlicensed spectrum, or the second transmission resource is associated with information about a channel on which the failure occurs in the channel access procedure and that is in one or more channels (channel) associated with the unlicensed spectrum.

In one embodiment, the interface circuit is specifically configured to send the first information to the access network device by using a communication resource corresponding to the first transmission resource when the processor determines that the failure occurs in the channel access procedure performed on the unlicensed spectrum.

In one embodiment, the interface circuit is specifically configured to send the first information to the access network device by using a communication resource associated with the channel on which the failure occurs in the channel access procedure of the unlicensed spectrum when the processor determines that the failure occurs in the channel access procedure performed on the unlicensed spectrum.

In one embodiment, the processor is specifically configured to: determine that the failure occurs in the channel access procedure performed on one channel of the one or more channels associated with the unlicensed spectrum, and determine that the failure occurs in the channel access procedure performed on the unlicensed spectrum.

In one embodiment, the processor is specifically configured to: determine that a quantity of times that the failure occurs in the channel access procedure on one channel of the one or more channels associated with the unlicensed spectrum is greater than a first threshold, and determine that the failure occurs in the channel access procedure performed on the unlicensed spectrum.

In one embodiment, the first information includes one or both of the information about the unlicensed spectrum or the information about the channel on which the failure occurs in the channel access procedure.

In one embodiment, the processor is further configured to determine a channel access priority class; and the processor is specifically configured to perform the channel access procedure on the unlicensed spectrum based on a channel access parameter corresponding to the channel access priority class.

In one embodiment, the processor is further specifically configured to determine the channel access priority class based on service information of the data transmitted on the first transmission resource and a mapping relationship, where the mapping relationship includes one or more pieces of service information and a channel access priority class corresponding to each piece of service information in the one or more pieces of service information, and different channel access priority classes correspond to different channel access parameters.

In one embodiment, the service information includes one or more of the following: a ProSe per-packet priority (PPPP), a ProSe per-packet reliability (PPPR), a logical channel group (LCG), or a quality of service flow identifier (QFI).

In one embodiment, the processor is further configured to obtain a first communication resource that is sent by the access network device and that is used by the first terminal to send information on a transmission link, where the transmission link is a wireless communication link between the first terminal and the access network device, and the first communication resource is associated with the unlicensed spectrum on which the failure occurs in the channel access procedure or is associated with the channel on which the failure occurs in the channel access procedure.

In one embodiment, the interface circuit and the processor of the communications apparatus are coupled to each other.

In one embodiment, the communications apparatus may further include a memory, configured to store code and data. The processor, the interface circuit, and the memory are coupled to each other.

According to a fifth aspect, this application provides a communications apparatus. The communications apparatus can implement the communication method described in any one of the second aspect or the possible implementations of the second aspect, and therefore can further implement beneficial effects in any one of the second aspect or the possible implementations of the second aspect. The communications apparatus may be a first terminal, or may be an apparatus that can support a first terminal in implementing the method in any one of the second aspect or the possible implementations of the second aspect, for example, a chip used in the first terminal. The communications apparatus may implement the foregoing method by using software, hardware, or hardware executing corresponding software.

In one embodiment, the communications apparatus includes: an obtaining unit, configured to obtain indication information that is sent by an access network device and that is of a first transmission resource used by the first terminal to send data on a sidelink, where the sidelink is a wireless communication link between the first terminal and a second terminal, and the first transmission resource is a resource of an unlicensed spectrum; a processing unit, configured to determine that the second terminal fails to parse a transport block sent by the first terminal on the first transmission resource; and a sending unit, configured to send first information to the access network device, where the first information is used to request to allocate the first transmission resource again.

In one embodiment, the communications apparatus provided in this embodiment of this application further includes: a receiving unit, configured to receive second information sent by the second terminal, where the second information includes one or more of the following: identifier information of the first terminal, hybrid automatic repeat request HARQ process identifier information, carrier identifier information, or transport block size information; and the processing unit is specifically configured to determine, based on the second information, that the second terminal fails to parse the transport block sent by the first terminal on the first transmission resource.

In one embodiment, the sending unit is further configured to: send a third request to the access network device when the processing unit determines that the second terminal successfully parses the transport block sent by the first terminal on the first transmission resource, where the third request is used to request to allocate a second transmission resource to the first terminal on the sidelink, and the second transmission resource is used for new transmission.

In one embodiment, the processing unit is further configured to determine, based on a fourth request that is sent by the second terminal and that is received by the receiving unit, that the second terminal successfully parses the transport block sent by the first terminal on the first transmission resource, where the fourth request is used to indicate that the second terminal successfully parses the transport block sent by the first terminal on the first transmission resource.

In another embodiment, this application further provides a communications apparatus. The communications apparatus may be a terminal or a chip used in a terminal. The communications apparatus includes a processor and an interface circuit. The interface circuit is configured to support the communications apparatus in performing the operations of receiving and sending a message/data on a communications apparatus side described in any one of the second aspect or the possible implementations of the second aspect. The processor is configured to support the communications apparatus in performing the operations of processing the message/data on the communications apparatus side in any one of the second aspect or the possible implementations of the second aspect. For specific corresponding operations, refer to the descriptions in any one of the second aspect or the possible implementations of the second aspect. Details are not described herein again in this embodiment of this application.

In one embodiment, the communications apparatus provided in this embodiment of this application includes: the interface circuit, configured to obtain indication information that is sent by an access network device and that is of a first transmission resource used by the first terminal to send data on a sidelink, where the sidelink is a wireless communication link between the first terminal and a second terminal, and the first transmission resource is a resource of an unlicensed spectrum. The processor is configured to determine that the second terminal fails to parse a transport block sent by the first terminal on the first transmission resource. The interface circuit is configured to send first information to the access network device, where the first information is used to request to allocate the first transmission resource again.

In one embodiment, the communications apparatus provided in this embodiment of this application further includes: the interface circuit, configured to receive second information sent by the second terminal, where the second information includes one or more of the following: identifier information of the first terminal, hybrid automatic repeat request (HARQ) process identifier information, carrier identifier information, or transport block size information. The processor is specifically configured to determine, based on the second information, that the second terminal fails to parse the transport block sent by the first terminal on the first transmission resource.

In one embodiment, the interface circuit is further configured to: send a third request to the access network device when the processor determines that the second terminal successfully parses the transport block sent by the first terminal on the first transmission resource, where the third request is used to request to allocate a second transmission resource to the first terminal on the sidelink, and the second transmission resource is used for new transmission.

In one embodiment, the processor is further configured to determine, based on a fourth request that is sent by the second terminal and that is received by the interface circuit, that the second terminal successfully parses the transport block sent by the first terminal on the first transmission resource, where the fourth request is used to indicate that the second terminal successfully parses the transport block sent by the first terminal on the first transmission resource.

According to a sixth aspect, this application provides a resource allocation apparatus. The resource allocation apparatus can implement the resource allocation method described in any one of the third aspect or the possible implementations of the third aspect, and therefore can further implement beneficial effects in any one of the third aspect or the possible implementations of the third aspect. The resource allocation apparatus may be an access network device, or may be an apparatus that can support an access network device in implementing the method in any one of the third aspect or the possible implementations of the third aspect, for example, a chip used in the access network device. The resource allocation apparatus may implement the foregoing method by using software, hardware, or hardware executing corresponding software.

In one embodiment, the resource allocation apparatus provided in this embodiment of this application includes: a sending unit, configured to send, to a first terminal, indication information of a first transmission resource used by the first terminal to send data on a sidelink, where the sidelink is a wireless communication link between the first terminal and a second terminal, and the first transmission resource is a resource of an unlicensed spectrum; a receiving unit, configured to receive first information used to request to allocate a second transmission resource to the sidelink of the unlicensed spectrum; and an allocation unit, configured to allocate the second transmission resource to the first terminal on the sidelink of the unlicensed spectrum based on the first information.

In one embodiment, the allocation unit is specifically configured to allocate the second transmission resource to the first terminal on the sidelink of the unlicensed spectrum when a determining unit determines, based on the first information, that a failure occurs in a channel access procedure performed on the unlicensed spectrum. It may be understood that when the determining unit determines that the failure occurs in the channel access procedure performed on the unlicensed spectrum, the second transmission resource allocated to the first terminal is used for retransmission.

In one embodiment, the determining unit is specifically configured to determine that the failure occurs in the channel access procedure performed on the unlicensed spectrum indicated by information about the unlicensed spectrum.

In one embodiment, the determining unit is specifically configured to: determine that the second transmission resource is associated with information about a channel on which the failure occurs in the channel access procedure, and determine that the failure occurs in the channel access procedure performed on the unlicensed spectrum associated with the information about the channel on which the failure occurs in the channel access procedure.

In one embodiment, the determining unit is specifically configured to: determine that the receiving unit receives the first information on a communication resource corresponding to the first transmission resource, and determine that the failure occurs in the channel access procedure performed on the unlicensed spectrum.

In one embodiment, the determining unit is specifically configured to: determine that the receiving unit receives the first information on a resource associated with a first channel, and determine that the failure occurs in the channel access procedure performed on the unlicensed spectrum.

In one embodiment, the first information includes at least one of the information about the unlicensed spectrum and the information about the channel on which the failure occurs in the channel access procedure; and the determining unit is further specifically configured to determine, based on the at least one of the information about the unlicensed spectrum and the information about the channel on which the failure occurs in the channel access procedure, that the failure occurs in the channel access procedure performed on the unlicensed spectrum.

In one embodiment, the sending unit is further configured to send a first communication resource used by the first terminal to send information on a transmission link when the determining unit determines that the failure occurs in the channel access procedure performed on the unlicensed spectrum, where the transmission link is a wireless communication link between the first terminal and the access network device, and the first communication resource is associated with the unlicensed spectrum on which the failure occurs in the channel access procedure or is associated with the channel on which the failure occurs in the channel access procedure.

In one embodiment, the allocation unit is further configured to allocate the second transmission resource to the first terminal on the sidelink when the determining unit determines, based on the first information, that a success occurs in the channel access procedure performed on the unlicensed spectrum, where when the determining unit determines that the success occurs in the channel access procedure, the second transmission resource allocated by the access network device to the first terminal is used for new transmission.

Specifically, for a manner in which the access network device determines that the success occurs in the channel access procedure, refer to a manner in which the failure occurs in the channel access procedure. Details are not described herein.

In one embodiment, the allocation unit is further specifically configured to allocate the second transmission resource to the first terminal on the sidelink of the unlicensed spectrum when the determining unit determines, based on the first information, that the second terminal fails to parse the transport block sent by the first terminal on the first transmission resource.

In one embodiment, the first information includes one or more of the following: identifier information of the first terminal, hybrid automatic repeat request (HARD) process identifier information, carrier identifier information, or transport block size information.

In one embodiment, the allocation unit is further specifically configured to allocate the second transmission resource to the first terminal on the sidelink of the unlicensed spectrum when the determining unit determines, based on the first information, that the second terminal successfully parses the transport block sent by the first terminal on the first transmission resource, where when the determining unit determines that the second terminal successfully parses the transport block sent by the first terminal on the first transmission resource, the second transmission resource allocated to the first terminal is used for new transmission.

In another embodiment, this application further provides a resource allocation apparatus. The resource allocation apparatus may be an access network device or a chip used in an access network device. The resource allocation apparatus includes a processor and an interface circuit. The interface circuit is configured to support the resource allocation apparatus in performing the operations of receiving and sending a message/data on a resource allocation apparatus side described in any one of the third aspect or the possible implementations of the third aspect. The processor is configured to support the resource allocation apparatus in performing the operations of processing the message/data on the resource allocation apparatus side in any one of the third aspect or the possible implementations of the third aspect. For specific corresponding operations, refer to the descriptions in any one of the third aspect or the possible implementations of the third aspect. Details are not described herein again in this embodiment of this application.

In another embodiment, the resource allocation apparatus provided in this embodiment of this application includes: an interface circuit, configured to send, to a first terminal, indication information of a first transmission resource used by the first terminal to send data on a sidelink, where the sidelink is a wireless communication link between the first terminal and a second terminal, and the first transmission resource is a resource of an unlicensed spectrum, where the interface circuit is configured to receive first information used to request to allocate a second transmission resource to the sidelink of the unlicensed spectrum; and a processor, configured to allocate the second transmission resource to the first terminal on the sidelink of the unlicensed spectrum based on the first information.

In one embodiment, the processor is specifically configured to: allocate the second transmission resource to the first terminal on the sidelink of the unlicensed spectrum when a determining unit determines, based on the first information, that a failure occurs in a channel access procedure performed on the unlicensed spectrum. It may be understood that when the access network device determines that the failure occurs in the channel access procedure performed on the unlicensed spectrum, the second transmission resource allocated to the first terminal is used for retransmission.

In one embodiment, the processor is configured to determine that the failure occurs in the channel access procedure performed on the unlicensed spectrum indicated by information about the unlicensed spectrum.

In one embodiment, the processor is configured to: determine that the second transmission resource is associated with information about a channel on which the failure occurs in the channel access procedure, and determine that the failure occurs in the channel access procedure performed on the unlicensed spectrum associated with the information about the channel on which the failure occurs in the channel access procedure.

In one embodiment, the processor is configured to: determine that the receiving unit receives the first information on a communication resource corresponding to the first transmission resource, and determine that the failure occurs in the channel access procedure performed on the unlicensed spectrum.

In one embodiment, the processor is configured to: determine that the receiving unit receives the first information on a resource associated with a first channel, and determine that the failure occurs in the channel access procedure performed on the unlicensed spectrum.

In one embodiment, the first information includes at least one of the information about the unlicensed spectrum and the information about the channel on which the failure occurs in the channel access procedure; and the processor is further specifically configured to determine, based on the at least one of the information about the unlicensed spectrum and the information about the channel on which the failure occurs in the channel access procedure, that the failure occurs in the channel access procedure performed on the unlicensed spectrum.

In one embodiment, the interface circuit is further configured to send a first communication resource used by the first terminal to send information on a transmission link when the determining unit determines that the failure occurs in the channel access procedure performed on the unlicensed spectrum, where the transmission link is a wireless communication link between the first terminal and the access network device, and the first communication resource is associated with the unlicensed spectrum on which the failure occurs in the channel access procedure or is associated with the channel on which the failure occurs in the channel access procedure.

In one embodiment, the processor is further configured to allocate the second transmission resource to the first terminal on the sidelink when the determining unit determines, based on the first information, that a success occurs in the channel access procedure performed on the unlicensed spectrum, where when the determining unit determines that the success occurs in the channel access procedure, the second transmission resource allocated by the processor to the first terminal is used for new transmission.

Specifically, for a manner in which the processor determines that the success occurs in the channel access procedure, refer to a manner in which the failure occurs in the channel access procedure. Details are not described herein.

In one embodiment, the processor is specifically configured to allocate the second transmission resource to the first terminal on the sidelink of the unlicensed spectrum when determined, based on the first information, that the second terminal fails to parse the transport block sent by the first terminal on the first transmission resource.

In one embodiment, the first information includes one or more of the following: identifier information of the first terminal, hybrid automatic repeat request HARQ process identifier information, carrier identifier information, or transport block size information.

In one embodiment, the processor is further specifically configured to allocate the second transmission resource to the first terminal on the sidelink of the unlicensed spectrum when the determining unit determines, based on the first information, that the second terminal successfully parses the transport block sent by the first terminal on the first transmission resource, where determined that the second terminal successfully parses the transport block sent by the first terminal on the first transmission resource, the second transmission resource allocated to the first terminal is used for new transmission.

In one embodiment, the interface circuit and the processor of the resource allocation apparatus are coupled to each other.

In one embodiment, the resource allocation apparatus may further include a memory, configured to store code and data. The processor, the interface circuit, and the memory are coupled to each other.

According to a seventh aspect, this application provides a computer-readable storage medium. The computer-readable storage medium stores a computer program or an instruction. When the computer program or the instruction is run on a computer, the computer is enabled to perform the communication method described in any one of the first aspect or the possible designs of the first aspect.

According to an eighth aspect, this application provides a computer-readable storage medium. The computer-readable storage medium stores a computer program or an instruction. When the computer program or the instruction is run on a computer, the computer is enabled to perform the communication method described in any one of the second aspect or the possible designs of the second aspect.

According to a ninth aspect, this application provides a computer-readable storage medium. The computer-readable storage medium stores a computer program or an instruction. When the computer program or the instruction is run on a computer, the computer is enabled to perform the resource allocation method described in any one of the third aspect or the possible designs of the third aspect.

According to a tenth aspect, this application provides a computer program product including an instruction. When the computer program product runs on a computer, the computer is enabled to perform one or more of the first aspect or the possible implementations of the first aspect.

According to an eleventh aspect, this application provides a computer program product including an instruction. When the computer program product runs on a computer, the computer is enabled to perform one or more of the second aspect or the possible implementations of the second aspect.

According to a twelfth aspect, this application provides a computer program product including an instruction. When the computer program product runs on a computer, the computer is enabled to perform one or more of the third aspect or the possible implementations of the third aspect.

According to a thirteenth aspect, this application provides a chip. The chip includes a processor and an interface circuit. The interface circuit is coupled to the processor. The processor is configured to run a computer program or an instruction, to implement the operations of processing the message/data on the first terminal side described in any one of the first aspect or the embodiments of the first aspect. The interface circuit is configured to implement the operations of sending and receiving the message/data on the first terminal side described in any one of the first aspect or the embodiments of the first aspect. The interface circuit is configured to communicate with a module other than the chip.

According to a fourteenth aspect, this application provides a chip. The chip includes a processor and an interface circuit. The interface circuit is coupled to the processor. The processor is configured to run a computer program or an instruction, to implement the operations of processing the message/data on the first terminal side described in any one of the second aspect or the embodiments of the second aspect. The interface circuit is configured to implement the operations of sending and receiving the message/data on the first terminal side described in any one of the second aspect or the embodiments of the second aspect. The interface circuit is configured to communicate with a module other than the chip.

According to a fifteenth aspect, an embodiment of this application provides a chip. The chip includes a processor and an interface circuit. The interface circuit is coupled to the processor. The processor is configured to run a computer program or an instruction, to implement the operations of processing the message/data on the access network device side described in any one of the third aspect or the embodiments of the third aspect. The interface circuit is configured to implement the operations of sending and receiving the message/data on the access network device side described in any one of the third aspect or the embodiments of the third aspect. The interface circuit is configured to communicate with a module other than the chip.

Optionally, the chip described in this application may further include one or more memories, and the one or more memories store an instruction or a computer program.

According to a sixteenth aspect, an embodiment of this application provides a communications system. The communications system includes the communications apparatus described in any one of the fourth aspect or the embodiments of the fourth aspect, and the resource allocation apparatus described in any one of the sixth aspect or the embodiments of the sixth aspect.

According to a seventeenth aspect, an embodiment of this application provides a communications system. The communications system includes the communications apparatus described in any one of the fifth aspect or the embodiments of the fifth aspect, and the resource allocation apparatus described in any one of the sixth aspect or the embodiments of the sixth aspect.

Any apparatus, computer storage medium, computer program product, chip, or communications system provided above is configured to perform the corresponding method provided above. Therefore, for beneficial effects that can be achieved by the apparatus, computer storage medium, computer program product, chip, or communications system, refer to beneficial effects of a corresponding solution in the corresponding method provided above. Details are not described herein again.

DESCRIPTION OF EMBODIMENTS

Figure 1:
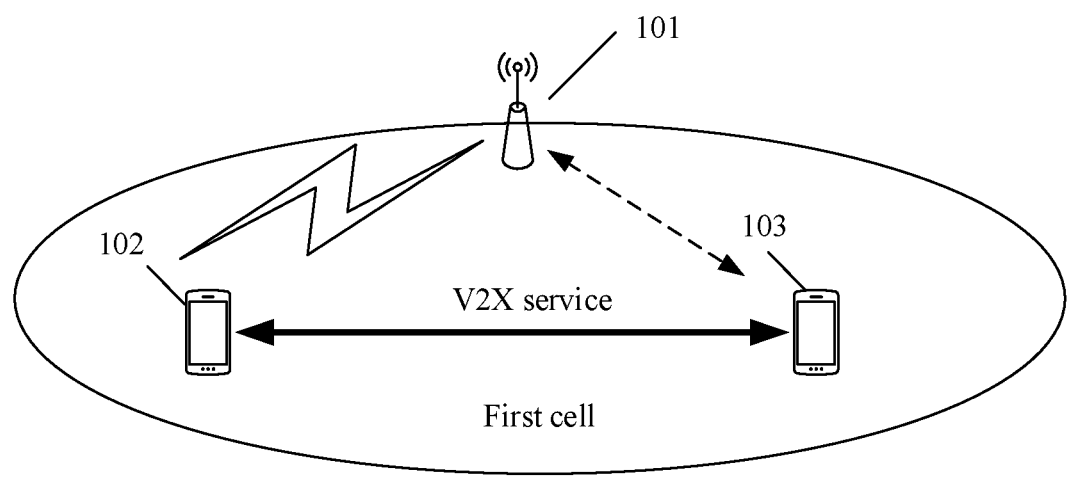
FIG. 1 is a block diagram 1 of a communications system according to an embodiment of this application.

In this application, "of", "relevant", and "corresponding" may be interchangeably used sometimes. It should be pointed out that, consistent meanings are expressed when differences are not emphasized.

Before the embodiments of this application are described, terms in the embodiments of this application are first described.

(1) A sidelink (Sidelink) is a link for communication between any two terminals.

(2) Sidelink data is data transmitted by any two terminals on a sidelink.

(3) A sidelink resource is a resource that is allocated by an access network device to a terminal 1 on a sidelink and that is used for communication with a terminal 2.

(4) New transmission means that after transmitting a transport block 1 on a sidelink resource allocated by an access network device, a terminal sends a next transport block 2 to another terminal.

(5) Retransmission means that when a terminal 2 fails to parse a transport block 1 sent by a terminal 1 on a sidelink resource or a terminal 1 fails to send a transport block 1 on a sidelink resource, the terminal a resends the transport block 1 to the terminal 2.

It should be noted that in the embodiments of this application, the word such as "example" or "for example" is used to represent giving an example, an illustration, or a description. Any embodiment or design solution described as an "example" or "for example" in the embodiments of this application should not be explained as being more preferred or more advantageous than another embodiment or design scheme. Exactly, use of the word "example", "for example", or the like is intended to present a relative concept in a specific manner.

In this application, "at least one" refers to one or more, and "a plurality of" refers to two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural. In addition, for convenience of clear description of the technical solutions in the embodiments of this application, in the embodiments of this application, words such as "first", "second", and the like are used to distinguish same objects or similar objects whose functions and purposes are basically the same. A person skilled in the art may understand that the words such as "first" and "second" do not limit a quantity or an execution sequence, and the words such as "first" and "second" do not indicate a definite difference.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that the technical solutions provided in the embodiments of this application can also be used for similar technical problems as a network architecture evolves and a new service scenario emerges.

FIG. 1 is a block diagram of a communications system according to an embodiment of this application. The communications system includes one or more access network devices 101, one or more first terminals 102 that communicate with the access network device 101, and a second terminal 103 that communicates with the first terminal 102.

In one embodiment, the access network device 101 may further communicate with the second terminal 103.

There is a first interface between the access network device 101 and the first terminal 102, there is a first interface between the access network device 101 and the second terminal 103, and there is a second interface between the first terminal 102 and the second terminal 103.

For example, the first interface may be a Uu interface, and the second interface may be a PC5 interface.

A communication scenario of a part of V2X (where X represents anything) services (for example, vehicle to vehicle (V2V) communication), or vehicle to infrastructure (V2I) communication (for example, the infrastructure is a road side unit (RSU), or vehicle to pedestrian (V2P) communication, or vehicle to network (V2N) communication) also belongs to a scenario of direct communication between terminals. Therefore, the V2X service may be transmitted by using a device to device (D2D) technology. However, in an actual process, when direct communication is performed between two or more terminals (for example, vehicles), an interface for direct communication between two vehicles may be referred to as a PC5 interface, and an internet of vehicles dedicated frequency band (for example, 5.9 GHz) is used; and an interface between a vehicle and an access network device may be referred to as a Uu interface, and a cellular network frequency band (for example, 1.8 GHz) is used.

In this embodiment of this application, a link for communication between two terminals is referred to as a sidelink. For example, the first terminal 102 and the second terminal 103 may transmit a V2X service on a sidelink.

It may be understood that there is only one access network device, one first terminal, and one second terminal shown in FIG. 1. In an actual process, there may be two or more access network devices, first terminals, and second terminals. Certainly, the communications system may further include another network element (for example, a core network device). The access network device may be connected to the core network device. The core network device may be a network element in a 4G core network (for example, an evolved packet core (EPC)) or a 5G core network (5G Core, 5GC).

In addition, in FIG. 1, an example in which a cell served by the access network device 101 may be one or more cells is used. This is not specifically limited in this application.

For example, as shown in FIG. 1, a cell served by the access network device 101 is a first cell. It may be understood that FIG. 1 is described by using an example in which one access network device serves one cell.

In this embodiment of the present application, the terminal may be distributed in a wireless network. Each terminal may be static or mobile.

The first terminal 102 and the second terminal 103 may be terminals in a same cell, or may be terminals in different cells. In FIG. 1, for example, the first terminal 102 and the second terminal 103 are located in a first cell, and the first cell is a cell served by the access network device 101.

Figure 2:
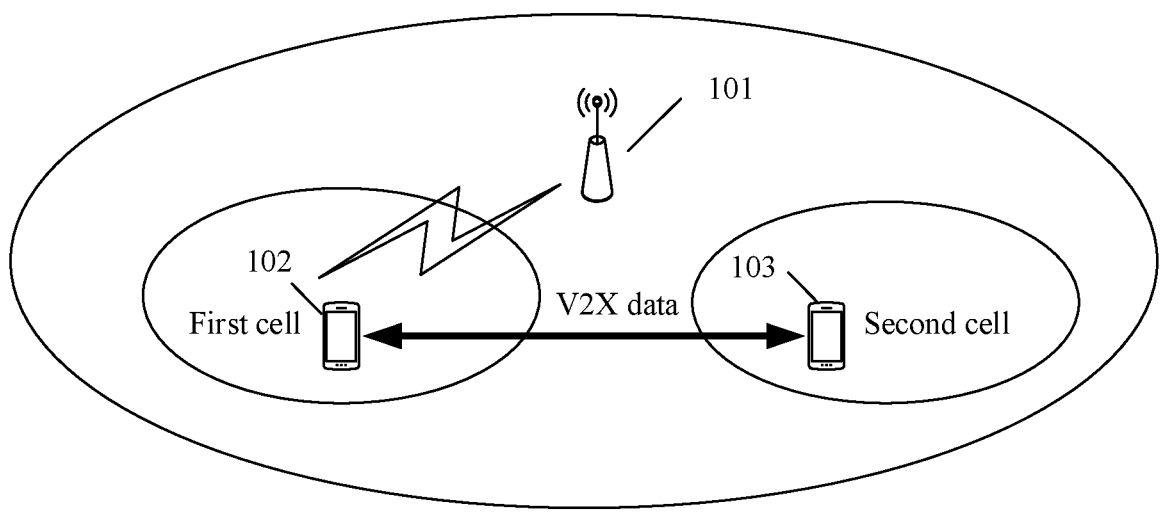
FIG. 2 is a block diagram 2 of a communications system according to an embodiment of this application.

FIG. 2 shows another communications system according to an embodiment of this application. A difference between the communications system shown in FIG. 2 and that shown in FIG. 1 lies in that a first terminal 102 and a second terminal 103 in FIG. 2 are located in different cells served by a same access network device. For example, in FIG. 2, cells served by an access network device 101 include a first cell and a second cell. A cell in which the first terminal 102 is located is the first cell, and a cell in which the second terminal 103 is located is the second cell.

Figure 3:
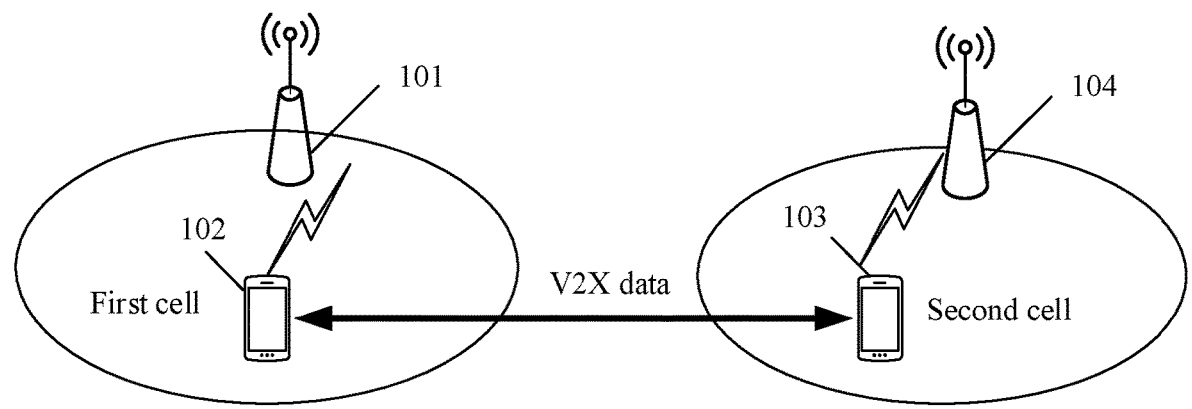
FIG. 3 is a block diagram 3 of a communications system according to an embodiment of this application.

FIG. 3 shows still another communications system according to an embodiment of this application. A difference between the communications system shown in FIG. 3 and that shown in FIG. 2 lies in that a first terminal 102 and a second terminal 103 in FIG. 3 are located in different cells, and cells in which the first terminal 102 and the second terminal 103 are located are cells served by different access network devices. For example, in FIG. 3, a cell served by an access network device 101 includes a first cell, and the first terminal 102 is located in the first cell served by the access network device 101. A cell served by an access network device 104 includes a third cell, and the second terminal 103 is located in the second cell served by the access network device 104. The access network device 101 communicates with the access network device 104 through a first interface.

In one embodiment, the access network device 101 in FIG. 3 may be a primary base station, and the access network device 104 may be a secondary base station.

The primary base station is the first base station accessed by the terminal 102 in a random access procedure. The primary base station is responsible for establishing a control plane connection to a core network control plane entity, transmitting a signaling message, determining whether to establish a secondary base station for the terminal 102, and selecting a secondary base station for the terminal 102.

The secondary base station is a second base station other than the primary base station, and is a node configured to provide an additional radio resource for the terminal 102. There may be no direct control plane connection between the secondary base station and the core network control plane entity.

In another embodiment, the access network device 101 and the access network device 104 in FIG. 3 may be independent base stations.

The communications systems shown in FIG. 1 to FIG. 3 may be applicable to a long term evolution (Long term Evolution, LTE) system, namely, a 4G network, or may be applicable to a new radio (New Radio, NR) system, namely, a 5G network, or various communications systems in the future.

Because the communications systems shown in FIG. 1 to FIG. 3 are applicable to different networks, names of the first interface are different, and are separately described in the following:

In an example, when the communications system is applicable to a 4G network, the access network device 101 and/or the access network device 104 are/is an evolved NodeB (Evolved NodeB, eNB) in the LTE system. For example, the first interface may be an X2 interface.

In another example, when the communications system is applicable to a 5G network, the access network device 101 and/or the access network device 104 are/is a next generation NodeB (The Next Generation Node B, gNB) in the NR system. For example, the first interface may be an Xn interface.

In still another example, in the communications system shown in FIG. 3, when the access network device 101 and the access network device 104 correspond to different network standards, for example, a network standard corresponding to the access network device 101 being the NR system, the access network device 101 may be a gNB; and a network standard corresponding to the access network device 104 being the LTE system, the access network device 104 may be an eNB. Alternatively, the access network device 101 is an eNB and the access network device 104 is a gNB. In this example, the first interface is an X2 interface.

A terminal is a device that provides a user with voice and/or data connectivity, for example, a handheld device or a vehicle-mounted device with a wireless connection function. The terminal may also be referred to as user equipment (UE), an access terminal, a user unit, a user station, a mobile station, a mobile station, a remote station, a remote terminal, mobile equipment, a user terminal, wireless telecom equipment, a user agent, user equipment, or a user apparatus. The terminal may be a station (STA) in a wireless local area network (WLAN), or may be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, a wearable device, a terminal in a next generation communications system (for example, a 5th generation (G) communications network), a terminal in a future evolved public land mobile network (PLMN), or the like. 5G may also be referred to as new radio (NR). In a possible application scenario of this application, the terminal is a terminal that often operates on land, for example, a vehicle-mounted device. In this application, for ease of description, a chip deployed in the foregoing device, or a chip may also be referred to as a terminal.

For example, in the embodiments of this application, the terminal may alternatively be a wearable device. The wearable device may also be referred to as a wearable intelligent device, and is a general term for wearable devices, such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

The access network device is an entity that is used in combination with the terminal and that may be configured to transmit or receive a signal. For example, the access network device may be an access point (AP) in a WLAN, an evolved NodeB (evolved NodeB, eNB or eNodeB) in LTE, a relay station, an access point, a vehicle-mounted device, a wearable device, an access network device in a future 5G network, an access network device in a future evolved PLMN network, or the like.

In addition, in the embodiments of the present application, the access network device provides a service for a cell, and the terminal communicates with the access network device by using a transmission resource (for example, a time domain resource, a frequency domain resource, or a time-frequency resource) used in the cell. The cell may be a cell corresponding to the access network device (for example, a base station). The cell may belong to a macro base station, or may belong to a base station corresponding to a small cell. The small cell herein may include a metro cell, a micro cell, a pico cell, a femto cell, or the like. These small cells are characterized by small coverage and low transmit power, and are applicable to providing a high-rate data transmission service.

Figure 4:
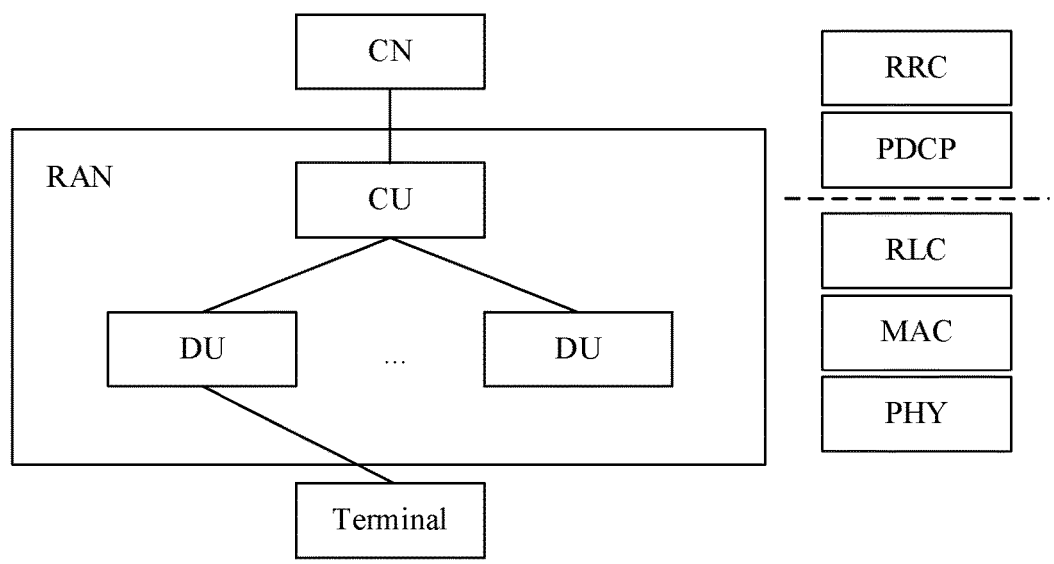
FIG. 4 is a block diagram of a base station according to an embodiment of this application.

A future access network may be implemented by using a cloud radio access network (C-RAN) architecture. Therefore, in a possible manner, a protocol stack architecture and a function of a conventional base station are divided into two parts: One part is referred to as a central unit (CU), and the other part is referred to as a distributed unit (DU). An actual deployment manner of the CU and the DU is relatively flexible. For example, CU parts of a plurality of base stations are integrated to form a function entity with a relatively large scale. FIG. 4 is a block diagram of a network architecture according to an embodiment of this application. As shown in FIG. 4, the network architecture includes a core network (CN) device and an access network (for example, a radio access network (RAN)) device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communications system, a RAN device (eNB) includes a baseband apparatus and a radio frequency apparatus. The radio frequency apparatus may be remotely arranged relative to the baseband apparatus (for example, a radio remote unit (RRU) is remotely arranged relative to a baseband unit (Base band Unit, BBU)). The RAN device is implemented by one node, and the node is configured to implement functions of protocol layers such as a radio resource control (RRC) layer, a packet data convergence protocol (PDCP) layer, a radio link control (RLC) layer, and a medium access control (MAC) layer. For another example, in an evolved structure, a baseband apparatus may include a CU and a DU, and a plurality of DUs may be centrally controlled by one CU. As shown in FIG. 4, the CU and the DU may be divided based on a protocol layer of a wireless network. For example, functions of a packet data convergence protocol layer and a protocol layer above the packet data convergence protocol layer are set on the CU. For example, the CU has a function of an RRC protocol layer and a function of the PDCP protocol layer. Functions of protocol layers below the PDCP layer, for example, a radio link control (RLC) layer, a media access control layer, and a physical layer, are set on the DU.

Division based on the protocol layer is merely an example, and division may alternatively be performed based on another protocol layer such as the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, the division may alternatively be performed in another manner. For example, the division is performed based on a delay. A function whose processing time needs to satisfy a delay requirement is set on the DU, and a function whose processing time does not need to satisfy the delay requirement is set on the CU.

In addition, a radio frequency apparatus may be not placed in the DU but is placed remotely from the DU, or may be integrated into the DU, or a part is placed remotely from the DU and a remaining part is integrated into the DU. This is not limited herein.

Figure 5:
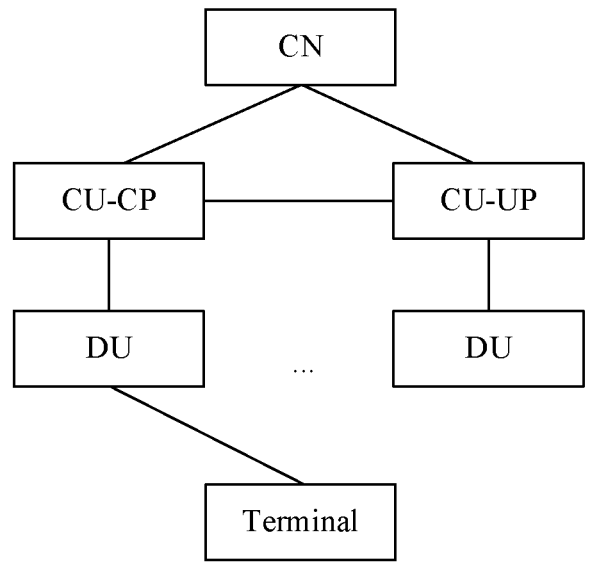
FIG. 5 is a block diagram of another base station according to an embodiment of this application.

In addition, still referring to FIG. 5, in comparison with the architecture shown in FIG. 4, a control plane (CP) and a user plane (UP) of the CU may alternatively be separated into different entities for implementation, and the different entities are a control plane CU entity (CU-CP entity) and a user plane CU entity (CU-UP entity).

In the foregoing network architecture, data generated by the CU may be sent to the terminal through the DU, or data generated by the terminal may be sent to the CU through the DU. The DU may directly encapsulate the data at a protocol layer and then transmit encapsulated data to the terminal or the CU without parsing the data. For example, data at the RRC layer or the PDCP layer is finally processed as data at a physical layer (PHY) and sent to the terminal, or is converted from received data at a PHY layer. In this architecture, the data at the RRC layer or the PDCP layer may also be considered to be sent by the DU.

In the foregoing embodiment, the CU is divided into an access network device in a RAN. In addition, the CU may alternatively be divided into an access network device in a CN. This is not limited herein.

An apparatus in the following embodiments of this application may be located in a terminal or an access network device based on a function implemented by the apparatus. When the foregoing CU-DU structure is used, the access network device may be a CU node, a DU node, or a RAN device including functions of a CU node and a DU node.

Figure 6:
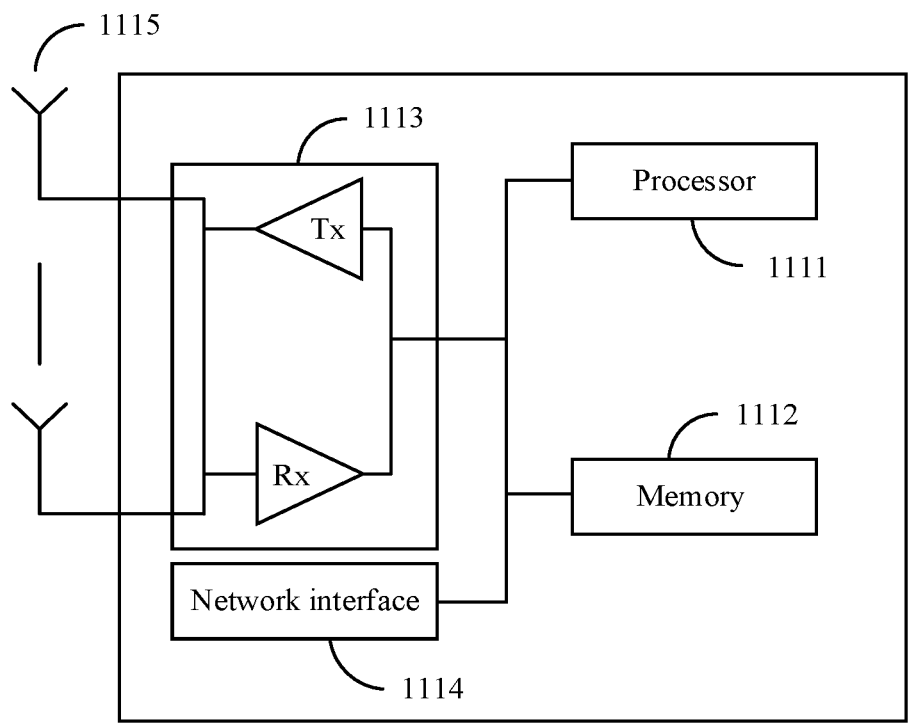
FIG. 6 is a block diagram of an access network device according to an embodiment of this application.

FIG. 6 is a block diagram of an access network device. For a structure of an access network device 101 or an access network device 104, refer to the structure shown in FIG. 6.

The access network device includes one or more processors 1111, one or more transceivers 1113, one or more network interfaces 1114, and one or more antennas 1115. In one embodiment, the access network device may further include one or more memories 1112.

The processor 1111, the memory 1112, the transceiver 1113, and the network interface 1114 are connected, for example, may be connected through a bus. The antenna 1115 is connected to the transceiver 1113. The network interface 1114 is configured to enable the access network device to be connected to another communications device over a communications link. For example, the access network device is connected to a core network device through an Si interface or an NG interface. In this embodiment of this application, connectors may include various interfaces, transmission lines, buses, or the like. This is not limited in this embodiment.

In this embodiment of this application, the processor such as the processor 1111 may include at least one of the following types: a general-purpose central processor (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 1111 may be a single-core processor (single-CPU) or a multi-core processor (multi-CPU). The one or more processors 1111 may be integrated into one chip or located on a plurality of different chips.

In this embodiment of this application, the memory such as the memory 1112 may include at least one of the following types: a read-only memory (ROM) or another type of static storage device that can store static information and an instruction, or a random access memory (RAM) or another type of dynamic storage device that can store information and an instruction, or may be an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory is not limited herein.

The memory 1112 may exist independently and is connected to the processor 1111 through the bus. In one embodiment, the memory 1112 may alternatively be integrated with the processor 1111, for example, integrated into a chip. The memory 1112 can store program code for executing the technical solutions in the embodiments of this application, and the processor 1111 controls execution of the program code. Various types of to-be-executed computer program code may also be considered as a driver of the processor 1111. For example, the processor 1111 is configured to execute the computer program code stored in the memory 1112, to implement the technical solutions in the embodiments of this application.

The transceiver 1113 may be configured to support receiving or sending of a radio frequency signal between the access network device and the terminal, and the transceiver 1113 may be connected to the antenna 1115. The transceiver 1113 includes a transmitter Tx and a receiver Rx. Specifically, the one or more antennas 1115 may receive a radio frequency signal. The receiver Rx of the transceiver 1113 is configured to: receive the radio frequency signal from the antenna, convert the radio frequency signal into a digital baseband signal or a digital intermediate frequency signal, and provide the digital baseband signal or the digital intermediate frequency signal to the processor 1111, so that the processor 1111 performs further processing, for example, demodulation processing and decoding processing, on the digital baseband signal or the digital intermediate frequency signal. In addition, the transmitter Tx of the transceiver 1113 is further configured to: receive a modulated digital baseband signal or digital intermediate frequency signal from the processor 1111, convert the modulated digital baseband signal or digital intermediate frequency signal into a radio frequency signal, and send the radio frequency signal through the one or more antennas 1115. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing may be adjustable. The digital baseband signal and the digital intermediate frequency signal may be collectively referred to as a digital signal.

Figure 7:
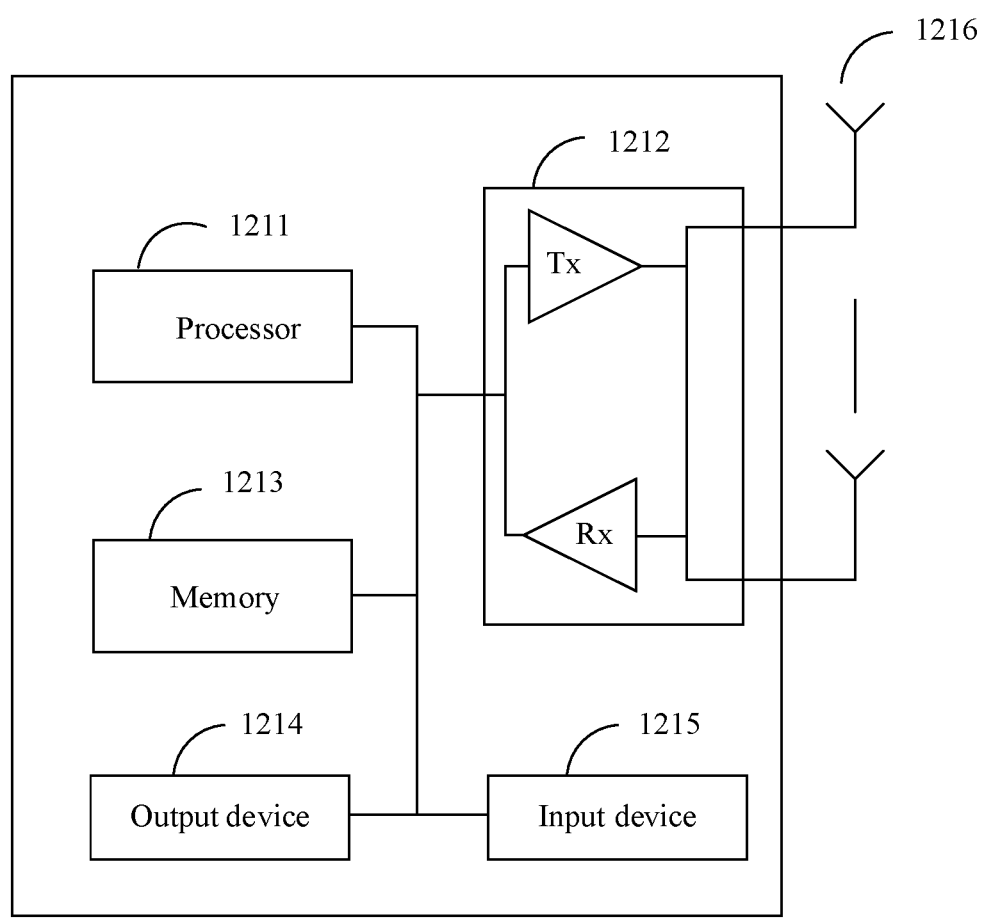
FIG. 7 is a block diagram of a terminal according to an embodiment of this application.

FIG. 7 is a block 1 diagram of a terminal according to an embodiment of this application. For a structure of a terminal 102 or a terminal 103, refer to the structure shown in FIG. 7.

The terminal includes one or more processors 1211, one or more transceivers 1212, and one or more memories 1213.

The processor 1211, the memory 1213, and the transceiver 1212 are connected. In one embodiment, the terminal 121 may further include an output device 1214, an input device 1215, and one or more antennas 1216. The antenna 1216 is connected to the transceiver 1212, and the output device 1214 and the input device 1215 are connected to the processor 1211.

For the transceiver 1212, the memory 1213, and the antenna 1216, refer to related descriptions in FIG. 6, to implement a similar function.

The processor 1211 may be a baseband processor, or may be a CPU. The baseband processor and the CPU may be integrated or separated.

The processor 1211 may be configured to implement various functions for the terminal, for example, configured to process a communication protocol and communication data, or configured to: control the entire terminal device, execute a software program, and process data of the software program, or configured to assist in completing a computing processing task, for example, image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (LCD), a light emitting diode (LED) display device, a cathode ray tube (CRT) display device, a projector, or the like. The input device 1215 communicates with the processor 1211, and may receive an input from a user in a plurality of manners. For example, the input device 1215 may be a mouse, a keyboard, a touchscreen device, a sensing device, or the like.

A communication method in the embodiments of this application may be performed by a first terminal, or may be performed by a communications apparatus used in a first terminal, for example, a chip. A resource allocation method may be performed by an access network device, or may be performed by a resource allocation apparatus used in an access network device, for example, a chip. In the following embodiments, a resource allocation method is performed by an access network device, and a communication method is performed by a first terminal. It may be understood that in the following operations, all operations performed by the access network device may be performed by the chip used in the access network device, and all operations performed by the first terminal may be performed by the chip used in the first terminal.

Figure 8:
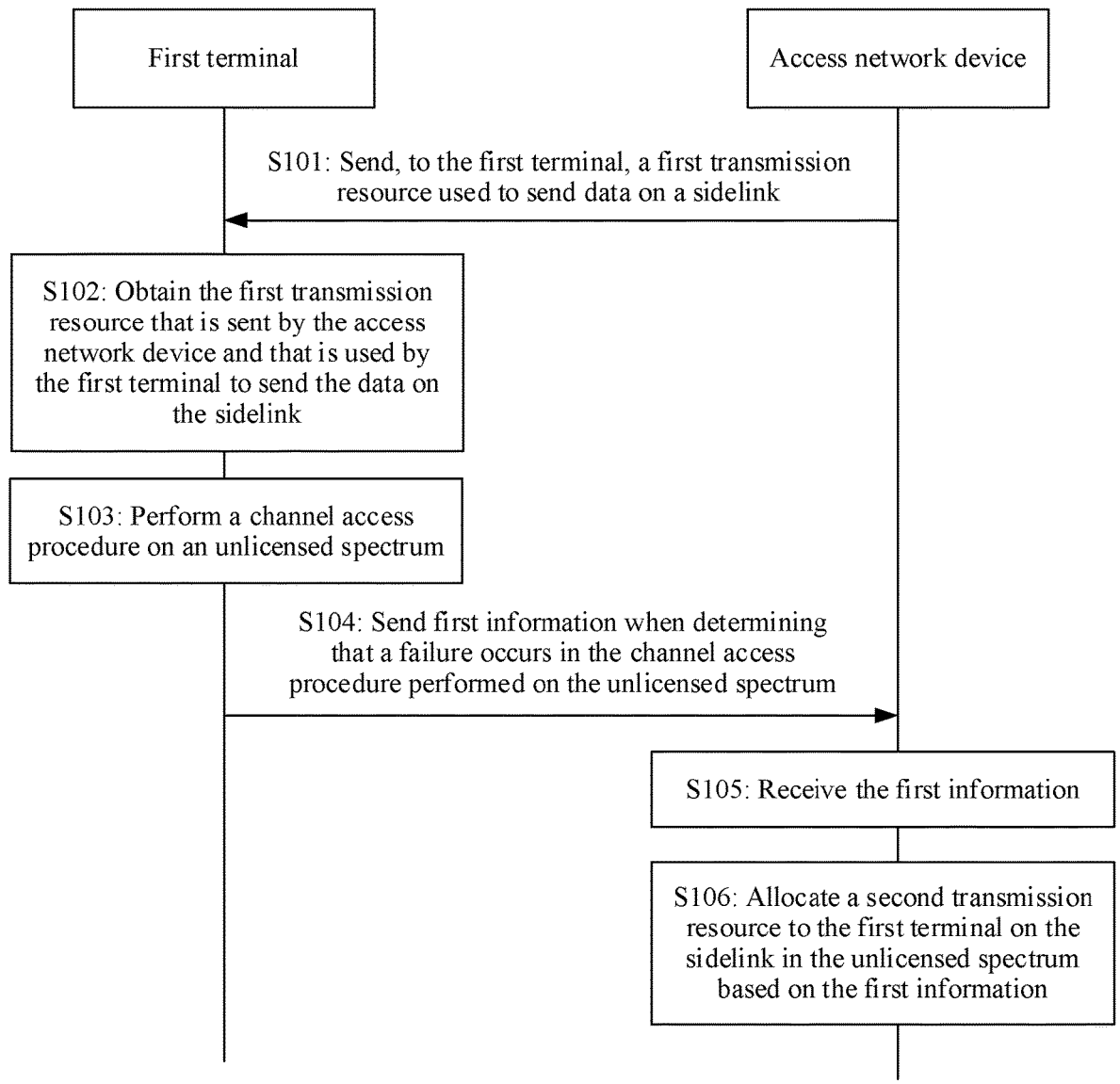
FIG. 8 is a flowchart 1 of interaction between communication and resource allocation according to an embodiment of this application.

FIG. 8 is a flowchart of interaction between a communication method and a resource allocation method according to an embodiment of this application. The method includes the following operations.

S101: An access network device sends, to a first terminal, indication information of a first transmission resource used by the first terminal to send data on a sidelink, where the sidelink is a wireless communication link between the first terminal and a second terminal, and the first transmission resource is a resource of an unlicensed spectrum.

For example, the indication information of the first transmission resource is used by the terminal to determine the first transmission resource. For example, the indication information may be an identifier of the first transmission resource, for example, an index, or a position of the first transmission resource of the unlicensed spectrum, or a start position and a length of the first transmission resource of the unlicensed spectrum.

The access network device may send, to the terminal in the following manner, the indication information of the first transmission resource used by the first terminal to send the data on the sidelink:

Cell-level semi-persistent configuration information, where a cell level may be understood as that indication information carried in the configuration information is valid for a terminal in a cell or the configuration information may be sent to the terminal in the cell; and semi-persistent may be understood as that the configuration information may be delivered by using higher layer signaling, and the higher layer signaling may be understood as radio resource control (Radio Resource Control, RRC) layer signaling. For example, the higher layer signaling may be a system message, an access network device may broadcast the system message, and the system message may carry the cell-level semi-static configuration information.

User-level semi-persistent configuration information, where a user level may be understood as that indication information carried in the configuration information is valid for a specific terminal or the configuration information may be sent to a specific terminal; and semi-persistent may be understood as that the configuration information may be delivered by using higher layer signaling, and the higher layer signaling may be understood as radio resource control (RRC) layer signaling. For example, the higher layer signaling may be an RRC message, an access network device may send the RRC message to the terminal, and the RRC message may include the terminal-level semi-static configuration information.

User-level dynamic configuration information, where a user level may be understood as that indication information carried in the configuration information is valid for a specific terminal or the configuration information may be sent to a specific terminal; and dynamic may be understood as that the configuration information may be delivered by using physical layer information. For example, the physical layer signaling may be downlink control information (DCI), an access network device may send the DCI through a physical downlink control channel (PDCCH), and the DCI may include the terminal-level dynamic configuration information. Herein, the PDCCH may be a group common (GC) PDCCH.

The first transmission resource may be a mode 3 resource or a mode 4 resource. The mode 3 resource is a resource allocated by the access network device to the first terminal on the unlicensed spectrum through a downlink control channel, for example, a dynamically-scheduled resource or a semi-persistently-scheduled resource (a radio resource control (RRC) configuration periodicity, DCI activation, or a periodic sidelink resource). The mode 4 resource is a sidelink resource allocated by the access network device by using RRC signaling. The mode 4 resource may be a competitive resource and is broadcast by using system information, or may be a non-competitive resource and is notified by using dedicated signaling.

In a mode 3 mode, each time before sending data, the first terminal needs to apply to the access network device for a transmission resource, and then sends service data to the second terminal on the transmission resource allocated by the access network device. In this case, because transmission resources of terminals are uniformly allocated by the access network device, a case in which adjacent terminals are allocated with a same resource generally does not occur. Therefore, the mode 3 mode can ensure better transmission reliability. However, each time the terminal applies for a resource, the terminal needs to exchange signaling with the access network device. Therefore, in comparison with a mode 4 mode, a transmission delay of sending data in the mode 3 mode may be longer than that in the mode 3.

In the mode 4 mode, when sending data, the terminal may autonomously obtain a sidelink communication resource from an SL transmission resource pool of the terminal through random selection, based on a listening reservation mechanism, or based on a partial listening reservation mechanism, to send the data. In this case, because resources of terminals are autonomously selected, the terminal may not need to exchange signaling with the access network device. Therefore, a transmission delay of sending data in the mode 4 mode may be shorter than that in the mode 3 mode.

S102: The first terminal obtains the indication information that is sent by the access network device and that is of the first transmission resource used by the first terminal to send the data on the sidelink.

S103: The first terminal performs a channel access procedure on the unlicensed spectrum.

For example, the first terminal may trigger the channel access procedure on the unlicensed spectrum when determining that the following condition is met:

In one embodiment, when determining that sidelink data that is allowed to be transmitted by using the unlicensed spectrum arrives, and triggering new sidelink transmission, the first terminal triggers to perform the channel access procedure on the unlicensed spectrum.

In another embodiment, the first terminal determines to trigger sidelink retransmission (including blind retransmission and feedback-based retransmission).

The channel access procedure is of per channel. One unlicensed spectrum may include one or more channels, and the first terminal selects the one or more channels to perform the channel access procedure.

For example, the unlicensed spectrum includes a channel 1, a channel 2, and a channel 3. If the first terminal determines to send the sidelink data through the channel 1 and the channel 2, the first terminal performs a channel access procedure for the channel 1, and performs a channel access procedure for the channel 2. One channel is a frequency domain resource with a fixed bandwidth.

In this embodiment of this application, one or more unlicensed spectrums are configured for the first terminal. The one or more unlicensed spectrums may be configured by the access network device for the first terminal, or may be preconfigured. This is not limited in this embodiment of this application.

For example, the first transmission resource is only a part of resources of the unlicensed spectrum. When the first terminal needs to send the data to the second terminal on the first transmission resource, the first terminal may perform the channel access procedure on the entire unlicensed spectrum on which the first transmission resource is located.

S104: The first terminal sends first information to the access network device when the first terminal determines that a failure occurs in the channel access procedure performed on the unlicensed spectrum, where the first information is used to request to allocate a second transmission resource to the sidelink of the unlicensed spectrum.

For example, the first transmission resource/the second transmission resource may be a sidelink resource.

Figure 9:
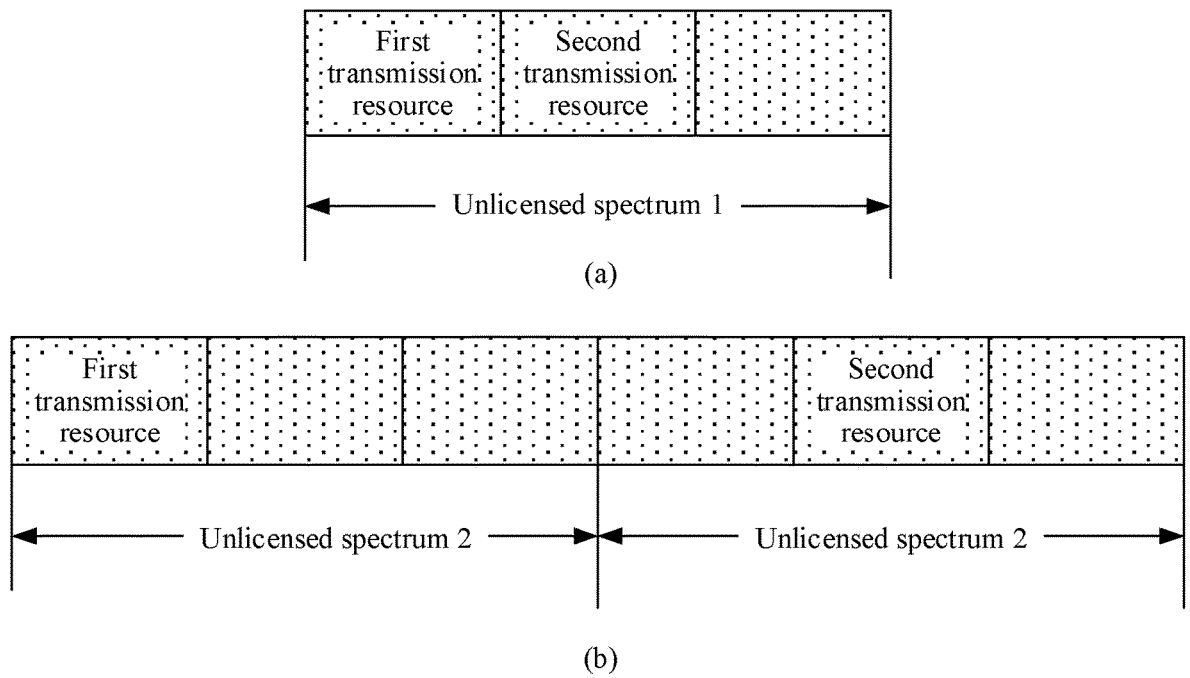
FIG. 9 shows a relationship between a transmission resource and an unlicensed spectrum according to an embodiment of this application.

It should be noted that the second transmission resource and the first transmission resource that are requested by the terminal may be resources in a same unlicensed spectrum in the one or more unlicensed spectrums of the terminal. For example, as shown in (a) in FIG. 9, both the first transmission resource and the second transmission resource are resources of an unlicensed spectrum 1. It may be understood that an example in which the first transmission resource and the second transmission resource are consecutive transmission resources of the unlicensed spectrum 1 is used in (a) in FIG. 9. Certainly, in an actual process, the first transmission resource and the second transmission resource may alternatively be inconsecutive transmission resources of the unlicensed spectrum 1.

The second transmission resource and the first transmission resource that are requested by the terminal may be resources in different unlicensed spectrums in the one or more unlicensed spectrums of the terminal. For example, as shown in (b) in FIG. 9, the first transmission resource is a resource of an unlicensed spectrum 1, and the second transmission resource is a resource of an unlicensed spectrum 2. It may be understood that an example in which the unlicensed spectrum 1 and the unlicensed spectrum 2 are consecutive unlicensed spectrums is used in (b) in FIG. 9. Certainly, in an actual process, the unlicensed spectrum 1 and the unlicensed spectrum 2 may alternatively be inconsecutive unlicensed spectrums.

That the first terminal determines that the failure occurs in the channel access procedure performed on the unlicensed spectrum may be implemented in any one of the following manners:

Manner 1: If the first terminal determines that the failure occurs in the channel access procedure on one or more channels in the one or more channels included of the unlicensed spectrum, the first terminal determines that the failure occurs in the channel access procedure performed on the unlicensed spectrum.

Specifically, the first terminal may determine a quantity of channels on which the failure occurs in the channel access procedure, or the access network device may configure, for the terminal, the quantity of channels on which the failure occurs in the channel access procedure. This is not limited in this embodiment of this application.

Manner 2: Because a periodic first transmission resource may be configured for the first terminal, a channel access procedure may need to be performed before each first transmission resource. Therefore, if the first terminal determines that a quantity of times that the failure occurs in the channel access procedure on one channel of the one or more channels included of the unlicensed spectrum is greater than a first threshold, the first terminal determines that the failure occurs in the channel access procedure performed on the unlicensed spectrum.

The first threshold is not limited in this embodiment of this application. The first threshold may be determined by the first terminal, or may be specified by the access network device for the first terminal, or may be preconfigured.

It may be understood that the unlicensed spectrum in this embodiment of this application includes one or more unlicensed spectrums. The one or more unlicensed spectrums may be configured by the access network device for the first terminal, or may be preconfigured.

A quantity of one or more channels included of the unlicensed spectrum may be configured by the access network device. If the first terminal may determine, in the one or more channels, a quantity of times that the failure occurs in the channel access procedure on channels or a channel is greater than the first threshold, the first terminal determines that the failure occurs in the channel access procedure performed on the unlicensed spectrum.

The first terminal determines, on the unlicensed spectrum, that the failure occurs in the channel access procedure on the channel under any one of the following conditions:

(a). Before a start time domain position of uplink transmission on the first transmission resource, the channel access procedure of the first terminal is not completed.

(b). Before all start time domain positions of uplink transmission on the first transmission resource, the channel access procedure of the first terminal is not completed.

For example, the first transmission resource has three start time domain positions in one slot (slot) in time domain: A, B, and C. For (a), if the terminal determines that the channel access procedure of the first terminal is not completed before the start time domain position A, that the channel access procedure of the first terminal is not completed determines that the failure occurs in the channel access procedure on the channel of the unlicensed spectrum. For (b), if the terminal determines that the channel access procedure of the first terminal is not completed before the start time domain positions A, B, and C, that the channel access procedure of the first terminal is not completed determines that the failure occurs in the channel access procedure on the channel of the unlicensed spectrum.

(c). If retransmission is configured of the unlicensed spectrum, the first terminal does not complete the channel access procedure before a start location of uplink transmission of all resources corresponding to the retransmission.

To enable the access network device to determine an unlicensed spectrum to which the second transmission resource is allocated, the first terminal may process the first information in the following manner:

In an example, the requested second transmission resource in the first information is associated with information about the unlicensed spectrum. In this way, the access network device allocates the second transmission resource to the first terminal of the unlicensed spectrum to which the first transmission resource belongs.

Specifically, in this embodiment of this application, each transmission resource is associated with an unlicensed spectrum to which the transmission resource belongs, and the association between the transmission resource and the unlicensed spectrum to which the transmission resource belongs means that information about the transmission resource is associated with information about the unlicensed spectrum. For example, an identifier of the second transmission resource is associated with an identifier of the unlicensed spectrum.

In one embodiment, the association between the transmission resource and the unlicensed spectrum to which the transmission resource belongs may be configured by the access network device. If the first terminal determines that the failure occurs in the channel access procedure performed on the unlicensed spectrum, the first terminal includes, in the first information, information associated with the information about the unlicensed spectrum.

For example, the information about the unlicensed spectrum is used to identify the unlicensed spectrum. For example, the information about the unlicensed spectrum may be an index of the unlicensed spectrum.

For example, if an unlicensed spectrum 1 is associated with an index 1, the first terminal includes the index 1 in the first information. In this way, after the access network device receives the first information, the access network device may determine that a failure occurs in a channel access procedure performed on the unlicensed spectrum 1.

In another embodiment, operation S104 may be implemented in the following manner: The first terminal sends the first information to the access network device by using a communication resource corresponding to the first transmission resource.

It may be understood that, in this embodiment of this application, the first terminal has a transmission resource corresponding to each of one or more communication resources. The one or more communication resources are used by the first terminal to send information to the access network device on a transmission link between the first terminal and the access network device. For example, the communication resource may be a Uu resource.

The transmission resource corresponding to each of the one or more communication resources in the first terminal may be preconfigured, or may be configured by the access network device.

When the transmission resource is configured by the access network device, In one embodiment, before S104, the method provided in this embodiment of this application further includes: The access network device sends an association relationship between the unlicensed spectrum and the one or more communication resources to the first terminal. The first terminal obtains the association relationship between the unlicensed spectrum and the one or more communication resources, where the association relationship is used to indicate that the unlicensed spectrum corresponds to the one or more communication resources.

Alternatively, in still another possible implementation, before S104, the method provided in this embodiment of this application further includes: The access network device sends an association relationship between each of the one or more channels included of the unlicensed spectrum and a communication resource to the first terminal, and the first terminal obtains the association relationship between each of the one or more channels included of the unlicensed spectrum and the communication resource. The association relationship is used to indicate a communication resource corresponding to each channel.

An objective of sending the association relationship by the access network device to the terminal is as follows: When a failure occurs in a channel access procedure performed on an unlicensed spectrum or a failure occurs in a channel access procedure on a channel, the first terminal may send the first information to the access network device on the transmission link between the first terminal and the access network device by using the communication resource associated with the unlicensed spectrum/channel. In this way, the access network device determines an unlicensed spectrum on which the failure occurs in the channel access procedure.

Figure 10:
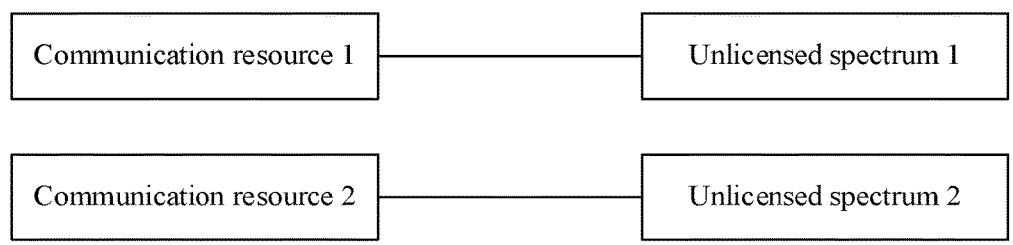
FIG. 10 is a block diagram 1 of association between a communication resource and an unlicensed spectrum according to an embodiment of this application.

As shown in FIG. 10, the first terminal determines that there is an association relationship between a communication resource 1 and information about an unlicensed spectrum 1, and an association relationship between a communication resource 2 and information about an unlicensed spectrum 2. For example, if the first terminal determines that a failure occurs in a channel access procedure performed on the unlicensed spectrum 1, the first terminal may send first information to the access network device on the communication resource 1. In this way, if the access network device receives the first information on the communication resource 1, the access network device may determine that the failure occurs in the channel access procedure performed on the unlicensed spectrum 1 associated with the communication resource 1.

In another example, requested second transmission resource in the first information is associated with information about a channel on which the failure occurs in the channel access procedure.

In one embodiment, the association may be configured by the access network device. If the terminal determines that the failure occurs in the channel access procedure performed on the unlicensed spectrum, the terminal includes, in the first information, information associated with the information about the channel on which the failure occurs in the channel access procedure.

For example, the information about the channel is used to identify the channel. For example, the information about the channel may be an index or identifier information of the channel.

In another embodiment, operation S104 may be implemented in the following manner: The first terminal sends the first information to the access network device by using a resource associated with the channel on which the failure occurs in the channel access procedure of the unlicensed spectrum.

Figure 11:
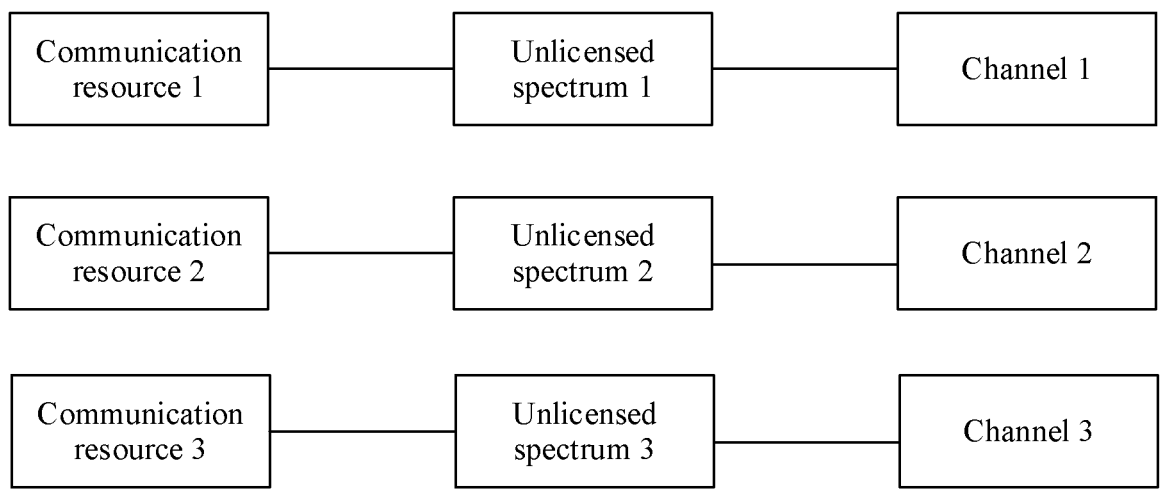
FIG. 11 is a block diagram 2 of association between a communication resource and an unlicensed spectrum according to an embodiment of this application.

As shown in FIG. 11, the first terminal determines that there is an association relationship between a communication resource 1 and information about an unlicensed spectrum 1, where a channel 1 is a channel of the unlicensed spectrum 1, an association relationship between a communication resource 2 and information about an unlicensed spectrum 2, where a channel 2 is a channel of the unlicensed spectrum 2, and an association relationship between a communication resource 3 and information about an unlicensed spectrum 3, where a channel 3 is a channel of the unlicensed spectrum 3. For example, if the first terminal determines that a failure occurs in a channel access procedure performed on the unlicensed spectrum 2, the first terminal may send first information to the access network device on the communication resource 2. In this way, after the access network device receives the first information, the access network device may determine that a failure occurs in a channel access procedure performed on the unlicensed spectrum 1 associated with the communication resource 1.

In still another example, the first terminal may include, in first information, at least one of information about a channel on which a failure occurs in a channel access procedure and information about an unlicensed spectrum.

For example, if the first terminal determines, in Manner 2, that a failure occurs in a channel access procedure performed on an unlicensed spectrum, the first information may be sent to the access network device in a form of a measurement report.

In addition, if the first information carries the at least one of the information about the channel on which the failure occurs in the channel access procedure and the information about the unlicensed spectrum, or information associated with at least one of the information about the channel on which the failure occurs in the channel access procedure and the information about the unlicensed spectrum, the first terminal may send the first information on a resource associated with the channel or a communication resource corresponding to the first transmission resource. Alternatively, the first terminal may send the first information to the access network device on another resource. When the first terminal sends the first information on another resource, the first terminal needs to request another resource from the access network device before sending the first information. For a specific implementation in which the first terminal requests another resource from the access network device, refer to descriptions in the prior art. Details are not described herein.

S105: The access network device receives the first information.

In an example, the access network device receives the first information on a communication resource associated with an unlicensed spectrum or a channel on which a failure occurs in a channel access procedure.

For another example, if the first terminal requests another resource from the access network device before S104, the access network device receives the first information on the another resource requested by the first terminal.

For content of the first information received by the access network device, refer to that of the first information sent by the first terminal. Details are not described herein again. It may be understood that the access network device receives the first information in a corresponding manner based on that in which the first terminal sends the first information.

S106: The access network device allocates the second transmission resource to the first terminal on the sidelink of the unlicensed spectrum based on the first information.

For example, when the access network device determines, based on the first information, that the failure occurs in the channel access procedure performed on the unlicensed spectrum, the second transmission resource allocated by the access network device to the first terminal may be the same as or different from the first transmission resource in frequency domain. The second transmission resource and the first transmission resource may be resources in a same unlicensed spectrum, or may be resources in different unlicensed spectrums.

This embodiment of this application provides the communication method. The first terminal obtains the first transmission resource, and then performs the channel access procedure on the unlicensed spectrum to which the first transmission resource belongs. When the failure occurs in the channel access procedure, the first terminal cannot send the data to the second terminal on the first transmission resource. Therefore, to ensure that the first terminal can communicate with the second terminal on the unlicensed spectrum, the first terminal sends the first information to the access network device, to request the access network device to allocate the second transmission resource again to the sidelink of the unlicensed spectrum. In this way, the first terminal subsequently sends the data to the second terminal on the sidelink by using the requested second transmission resource.

In one embodiment, S106 may be implemented in the following manner: The access network device allocates the second transmission resource to the first terminal on the sidelink of the unlicensed spectrum when the access network device determines, based on the first information, that the failure occurs in the channel access procedure performed on the unlicensed spectrum.

The access network device may determine, in any one or more of the following manners, that the failure occurs in the channel access procedure performed on the unlicensed spectrum:

Manner A: An example in which the second transmission resource is associated with the information about the unlicensed spectrum is used.

The access network device determines that the second transmission resource is associated with the information about the unlicensed spectrum, and the access network device determines, based on the information associated with the information about the unlicensed spectrum, that the failure occurs in the channel access procedure performed on the unlicensed spectrum indicated by the information about the unlicensed spectrum.

In one embodiment, the access network device determines that the first information is received on the communication resource corresponding to the first transmission resource, and the access network device determines that the failure occurs in the channel access procedure performed on the unlicensed spectrum.

Manner B: An example in which the second transmission resource is associated with the information about the channel on which the failure occurs in the channel access procedure is used.

The access network device determines that the second transmission resource is associated with the information about the channel on which the failure occurs in the channel access procedure, and the access network device determines, based on the information associated with the information about the channel on which the failure occurs in the channel access procedure, that the failure occurs in the channel access procedure performed on the unlicensed spectrum associated with the information about the channel on which the failure occurs in the channel access procedure.

In one embodiment, the access network device determines that the first information is received on a resource associated with a first channel, and the access network device determines that the failure occurs in the channel access procedure performed on an unlicensed spectrum associated with the first channel.

Manner C: The first information includes at least one of the information about the unlicensed spectrum and the information about the channel on which the failure occurs in the channel access procedure. The access network device determines, based on the at least one of the information about the unlicensed spectrum and the information about the channel on which the failure occurs in the channel access procedure, that the failure occurs in the channel access procedure performed on the unlicensed spectrum.

In one embodiment, the access network device determines, based on the information about the unlicensed spectrum, that the failure occurs in the channel access procedure performed on the unlicensed spectrum indicated by the information about the unlicensed spectrum.

In one embodiment, the access network device determines, based on the information about the channel on which the failure occurs in the channel access procedure, that the failure occurs in the channel access procedure performed on the unlicensed spectrum in which the channel indicated by the information about the channel on which the failure occurs in the channel access procedure is located.

In another embodiment of this application, the method provided in this embodiment of this application further includes: When the first terminal determines that a success occurs in the channel access procedure performed on the unlicensed spectrum, the first terminal sends, to the access network device, a message used to indicate that the access succeeds. In this case, when receiving the message used to indicate that the access succeeds, the access network device may allocate a transmission resource used for new transmission to the first terminal. In this way, the first terminal may send a next transport block on the transmission resource used for new transmission. Specifically, for a manner in which the first terminal sends the message used to indicate that the access succeeds to the access network device, refer to the manner in which the first terminal sends the first information to the access network device.

It may be understood that, when the first terminal determines that the success occurs in the channel access procedure performed on the unlicensed spectrum, the first terminal may send the data to the second terminal on the first transmission resource.

When receiving the first information used to indicate that the access fails, the access network device may allocate, to the first terminal, the second transmission resource used for retransmission. In this way, the first terminal may retransmit, on the second transmission resource, a transport block that fails to be parsed.

Figure 12:
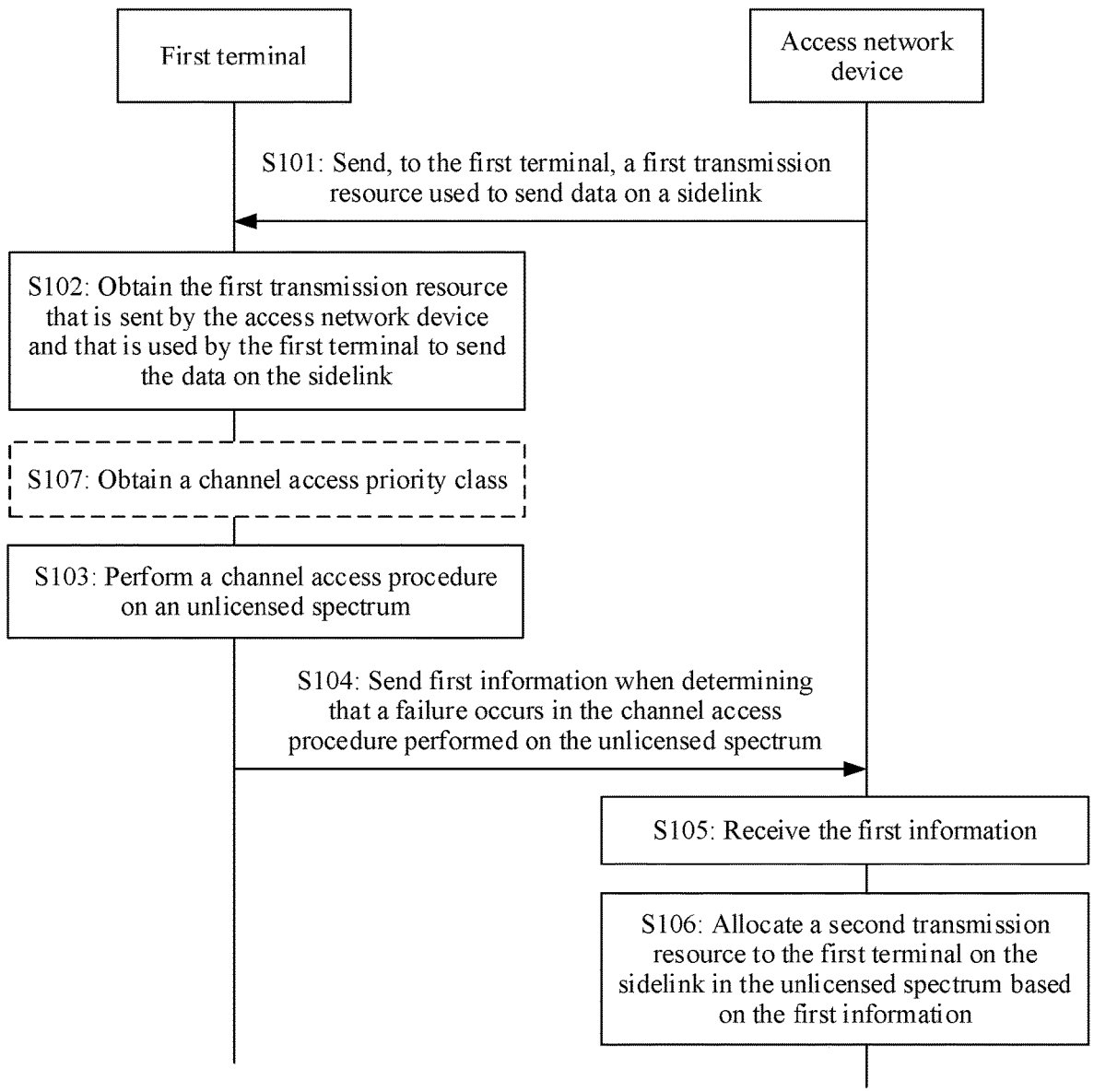
FIG. 12 is a flowchart 2 of interaction between communication and resource allocation according to an embodiment of this application.

Different service information has different requirements for channels. For example, some services require a low delay, and some services require high-reliability transmission. Although it is described in S103 to S106 that the first terminal needs to perform the channel access procedure, it does not indicate information about a used parameter of the channel access procedure when the first terminal performs the channel access procedure. Therefore, in another embodiment of this application, as shown in FIG. 12, the method provided in this embodiment of this application further includes the following operations.

S107: The first terminal obtains a channel access priority class (channel access priority class).

In one embodiment, S107 may be specifically implemented in the following manner: The first terminal receives the channel access priority class sent by the access network device.

In still another possible implementation, S107 may be specifically implemented in the following manner: The first terminal obtains the channel access priority class based on a mapping relationship and service information of the data transmitted on the first transmission resource. The mapping relationship includes one or more pieces of service information and a channel access priority class corresponding to each piece of service information in the one or more pieces of service information, and different channel access priority classes correspond to different channel access parameters.

For example, the first terminal constructs a media access control protocol data unit (MAC PDU) based on the sidelink resource, and determines a channel access priority class based on service information of data included in the MAC PDU of the sidelink resource.

It may be understood that the first terminal has a mapping relationship between one or more pieces of service information and one or more channel access priority classes. The mapping relationship may be preconfigured, or may be configured by the access network device for the first terminal.

For example, the service information includes one or more of the following: a ProSe per-packet priority (PPPP), a ProSe per-packet reliability (PPPR), a logical channel group (LCG), and a quality of service flow identifier (QFI)

For example, the PPPP may be 1 ms, 3 ms, or 20 ms. The PPPR can be 90%, 99%, or 99.999%.

The QFI is used to identify a QoS flow, and the QoS flow is a fine-grained QoS differentiation mechanism. One QoS flow has a same QoS parameter. The QoS parameter includes any one or more of the following parameters:

1. Resource type, where the resource type includes a guaranteed bit rate (GBR), a non-guaranteed bit rate (non-GBR), or a delay critical guaranteed bit rate (Delay critical GBR). The GBR is used to indicate a guaranteed transmission resource of a QoS flow. The resource type is used to determine whether a value of a dedicated guaranteed flow bit rate (GFBR), of a QoS level for traffic, related to a network resource is permanently allocated.

2. Priority level, where the priority level is used to indicate scheduling priorities of different QoS flows. A high-priority QoS flow is preferentially scheduled. A priority level associated with a 5G QoS feature is used to indicate a scheduling resource priority in a QoS flow.

3. Packet delay budget (PDB), where the PDB defines an upper limit of a delay of a data packet between a terminal and a user plane function (User Plane Function, UPF) of an N6 interface.

4. Packet error rate (PER), where the PER defines an upper limit of a packet loss ratio of a protocol data unit (PDU) (for example, an IP data packet), and the PDU may be a data packet that has been sent by a sender at a link layer but has not been successfully received and processed.

5. Averaging window, where the averaging window is defined only for a GBR QoS flow, and the averaging window indicates duration in which a guaranteed flow bit rate (GFBR) and maximum flow bit rate (MFBR) are to be calculated.

6. Maximum data burst volume (MDBV), where the MDBV is used only for a delay critical GBR resource type, and the MDBV indicates a maximum volume of data that needs to be served by a 5G access network (5G-AN) in a 5G-AN PDB (namely, a 5G-AN partial PDB).

Figure 13:
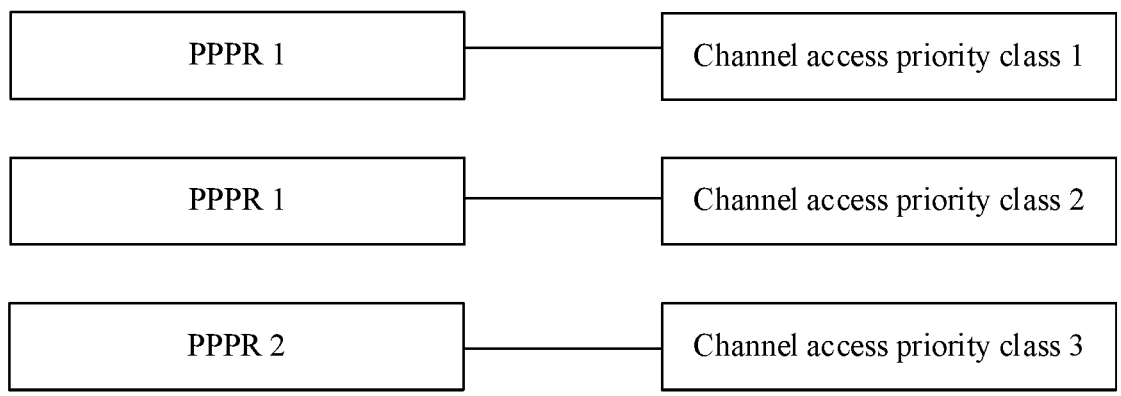
FIG. 13 is a block diagram of association between a channel priority class and a channel access parameter according to an embodiment of this application.

The following uses a PPPR as an example. As shown in FIG. 13, each PPPR or PPPP is associated with one channel access priority class.

In one embodiment, after the first terminal determines the channel access priority class, S103 may be specifically implemented in the following manner: The first terminal performs the channel access procedure on the unlicensed spectrum based on a channel access parameter corresponding to the channel access priority class.

It may be understood that each channel access priority class corresponds to one group of channel access parameters. Different channel access priority classes may correspond to different channel access parameters.

For example, a MAC PDU may include data corresponding to one or more pieces of service information, and the first terminal determines one target priority class based on a channel access priority class corresponding to the one or more pieces of service information. For example, for a PPPR with a highest/lowest reliability requirement, a PPPP with a shortest/longest delay requirement, and an LCG with a highest/lowest priority class, a corresponding channel access priority class is a target channel access priority class.

In one embodiment, the method provided in this embodiment of this application further includes the following operations. The access network device sends, to the first terminal, a first communication resource used by the first terminal to send information on a transmission link, where the transmission link is a wireless communication link between the first terminal and the access network device, and the first communication resource is associated with the unlicensed spectrum on which the failure occurs in the channel access procedure or is associated with the channel on which the failure occurs in the channel access procedure. The first terminal obtains a first communication resource that is sent by the access network device and that is used by the first terminal to send information on a transmission link, where the transmission link is a wireless communication link between the first terminal and the access network device, and the first communication resource is associated with the unlicensed spectrum on which the failure occurs in the channel access procedure or is associated with the channel on which the failure occurs in the channel access procedure.

For example, the first communication resource is a Uu resource. In this way, when an unlicensed spectrum or a failure occurs in a channel access procedure on a channel, the access network device allocates a Uu resource again to the unlicensed spectrum or the channel on which a failure occurs.

Figure 14:
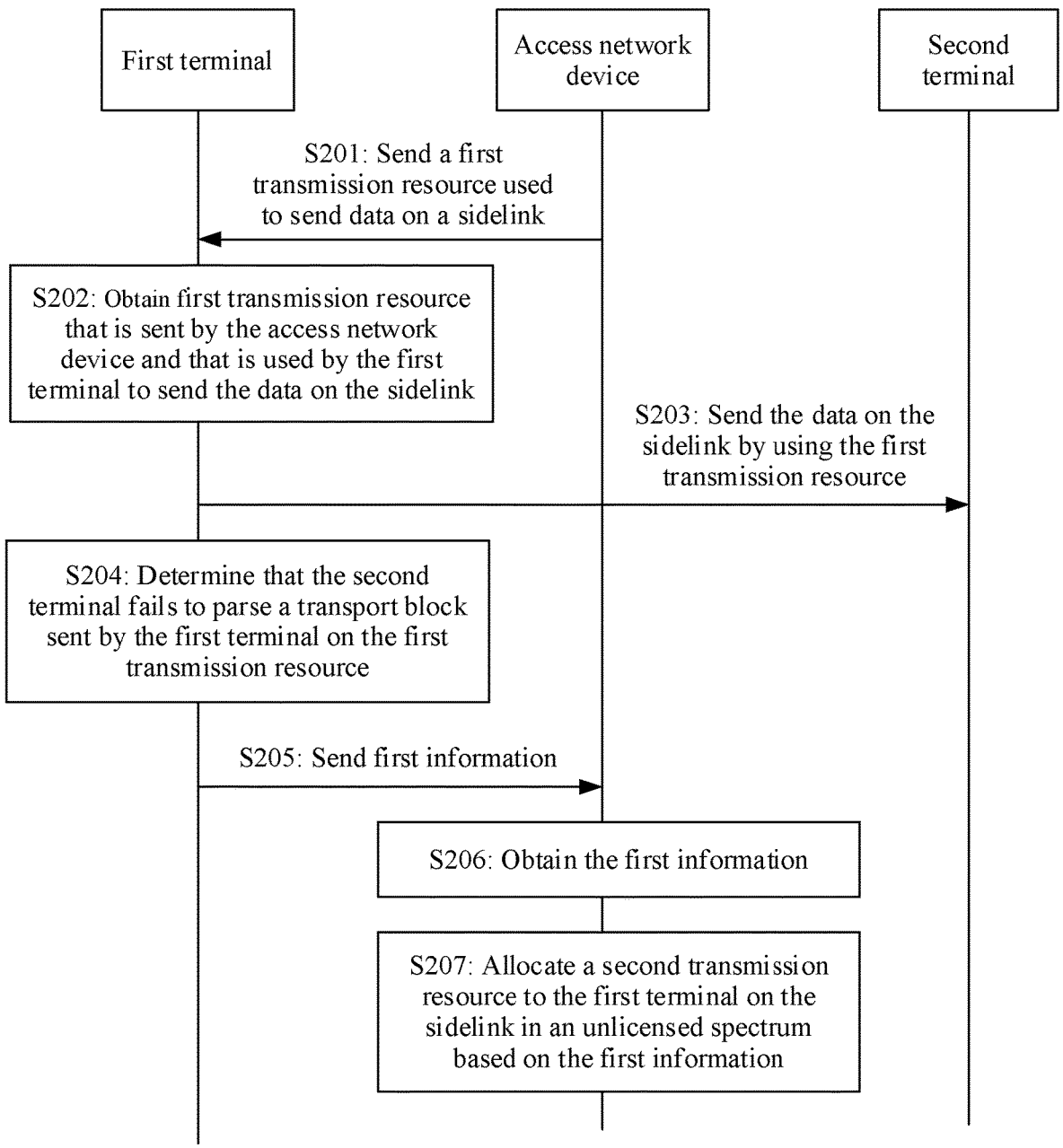
FIG. 14 is a flowchart 3 of interaction between a communication method and a resource allocation method according to an embodiment of this application.

FIG. 14 is a flowchart of another communication method and resource allocation method according to this application. The method includes the following operations.

S201: An access network device sends, to a first terminal, indication information of a first transmission resource used by the first terminal to send data on a sidelink, where the sidelink is a wireless communication link between the first terminal and a second terminal, and the first transmission resource is a resource in an unlicensed spectrum.

Specifically, for an implementation of S201, refer to the descriptions in S101. Details are not described herein again.

S202: The first terminal obtains the first transmission resource that is sent by the access network device and that is used by the first terminal to send the data on the sidelink.

S203: The first terminal sends the data to the second terminal on the sidelink by using the first transmission resource.

S204: The first terminal determines that the second terminal fails to parse a transport block sent by the first terminal on the first transmission resource.

In one embodiment, S204 may be implemented in the following manner: The first terminal receives a hybrid automatic repeat request (HARQ) message sent by the second terminal, where the HARQ message includes one or more of the following: identifier information of the first terminal, HARQ process identifier information, carrier identifier information, or transport block size information; and the first terminal determines, based on the HARQ message, that the second terminal fails to parse the transport block sent by the first terminal on the first transmission resource.

For example, the identifier information of the first terminal may be used to identify the first terminal in a cell accessed in a random access procedure. For example, a first identifier may be a cell radio network temporary identifier (C-RNTI).

Certainly, the first terminal may alternatively determine, in another manner, that the second terminal fails to parse the transport block sent by the first terminal on the first transmission resource.

For example, if the first terminal does not receive, within a specified time, an acknowledgement (ACK) sent by the second terminal, the first terminal determines that the second terminal fails to parse the transport block sent by the first terminal on the first transmission resource.

S205: The first terminal sends first information to the access network device, where the first information is used to request to allocate the first transmission resource again.

S206: The access network device obtains the first information.

In one embodiment, the first information obtained by the access network device is sent by the first terminal.

In another embodiment, S206 may be implemented in the following manner: The second terminal determines that the transport block sent by the first terminal on the first transmission resource fails to be parsed, and sends the first information to the access network device. Therefore, S206 may be implemented in the following manner: The access network device obtains the first information from the second terminal.

For example, the first information sent by the second terminal to the access network device may be a HARQ message, and the HARQ message is used to allocate the first transmission resource again to the first terminal. The first transmission resource is used for retransmission. The HARQ message includes identifier information of the first terminal, HARQ process identifier information, carrier identifier information, or transport block size information.

In one embodiment, when the access network device can obtain the first information from the second terminal, S204 and S205 may be skipped.

Example 1: When cells in which the first terminal and the second terminal are located both are cells served by the access network device, in the scenarios shown in FIG. 1 and FIG. 2, the HARQ message includes a V2X HARQ process identifier (HARQ ID) and HARQ feedback information. The second terminal may feed back HARQ feedbacks of a plurality of sidelink HARQ IDs in a bitmap manner.

Each bit position is associated with one HARQ ID. For example, if a bit is 1, it indicates an acknowledgement (ACK); or if a bit is 0, it indicates a negative acknowledgement (NACK).

In an example (1-1), the HARQ message may alternatively include: destination layer-2 identifier information (ID information), service identifier information, or identifier information of a receiver terminal (for example, identifier information of the second terminal).

In an example (1-2), the HARQ message may alternatively include source (Source) ID information and identifier information of a sender terminal (for example, a source ID is identifier information of the first terminal).

In an example (1-3), the HARQ message may alternatively include cell identifier information of a serving cell in which the first terminal is located, so that the access network device determines, based on the identifier information, a cell in which V2X HARQ feedback information is to be sent.

In an example (1-4), the HARQ message may alternatively include identifier information of the first terminal, for example, a C-RNRI, so that the access network device determines, based on the identifier information, a terminal to which V2X HARQ feedback information is to be sent.

In an example (1-5), the HARQ message may alternatively include a remaining time information indication. The access network device may determine, based on remaining time information, whether to forward V2X feedback information to the first terminal.

Example 2: When cells in which the first terminal and the second terminal are located are cells served by different access network devices, in the scenario shown in FIG. 3, the HARQ message includes one or more of the following:

a HARQ feedback, a V2X HARQ ID, or HARQ feedback information. The second terminal may feed back HARQ feedbacks of a plurality of sidelink HARQ IDs in a bitmap manner.

Each bit position is associated with a HARQ ID, where a bit is 1 (ACK) and a bit is 0 (NACK).

It may be understood that in Example 2, the HARQ message may alternatively include content described in the foregoing examples (1-1) to (1-5).

In one embodiment, in the scenario in FIG. 3, the second terminal first sends the HARQ message to an access network device to which the second terminal belongs. Then, the access network device to which the second terminal belongs sends the HARQ message to the access network device. For example, the second terminal first sends the HARQ message to an access network device 104, and then the access network device 104 sends the HARQ message to an access network device 101 through a first interface.

S207: The access network device allocates a second transmission resource to the first terminal on the sidelink of the unlicensed spectrum based on the first information.

It may be understood that S201 to S207 describe a case in which the first terminal determines that the second terminal fails to parse the transport block. When the first terminal determines that the second terminal successfully parses the transport block, the first terminal may also send second information to the access network device. The second information is used to request to allocate the second transmission resource to the first terminal on the sidelink. The second transmission resource is used for new transmission. Alternatively, when the second terminal successfully parses the transport block, the second terminal sends the second information to the access network device.

An embodiment of this application provides a communication method. In the method, when determining that a second terminal fails to parse data sent by a first terminal by using a first transmission resource in an unlicensed spectrum, the first terminal sends first information to an access network device, to request the access network device to allocate a first transmission resource again to the first terminal, so that the first terminal resends the data to the second terminal for retransmission. In this way, not only the first terminal and the second terminal can use the unlicensed spectrum, but also the access network device can be notified in time when transmission fails, so that the access network device allocates a transmission resource again to the first terminal.

The foregoing mainly describes the solutions in the embodiments of this application from a perspective of interaction between network elements. It may be understood that to implement the foregoing functions, the network elements such as the communications apparatus and the resource allocation apparatus include corresponding hardware structures and/or software modules for performing the functions. A person skilled in the art should be easily aware that, in combination with units and algorithm operations of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such as implementation goes beyond the scope of this application.

In the embodiments of this application, the communications apparatus and the resource allocation apparatus may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that division into units in the embodiments of this application is an example, and is merely logical function division. There may be another division manner during actual implementation.

The foregoing describes the methods in the embodiments of this application with reference to FIG. 8 to FIG. 14. The following describes communications apparatuses that are provided in embodiments of this application and that perform the foregoing methods. A person skilled in the art may understand that the method and the apparatus may be combined and referenced with each other. The communications apparatus provided in the embodiments of this application may perform the foregoing communication method, and the resource allocation apparatus may perform the resource allocation method in the foregoing embodiments.

In one embodiment, for example, in the method performed by an access network device in this embodiment of this application, the access network device may perform the method by using the structure shown in FIG. 6. An action of sending or receiving by the access network device may be completed by a processor 1111 of the access network device through an antenna 1115, and an action such as determining or processing by the access network device may be completed by the processor 1111 of the access network device. For example, the processor 1111 of the access network device may send, to a first terminal through the antenna 1115, indication information of a first transmission resource used by the first terminal to send data on a sidelink. For example, the processor 1111 receives first information through a receiver in a transceiver. For example, the processor 1111 of the access network device may allocate, a second transmission resource to the first terminal on the sidelink of an unlicensed spectrum based on the first information received by a transceiver 113. For example, when the processor 1111 of the access network device determines, based on the first information, that a failure occurs in a channel access procedure performed on the unlicensed spectrum, the processor 1111 of the access network device allocates, of the unlicensed spectrum, a second transmission resource to the first terminal on the sidelink.

In one embodiment, for example, in the method performed by a first terminal in this embodiment of this application, the first terminal may perform the method by using the structure shown in FIG. 7. An action of sending or receiving by the first terminal may be completed by a processor 1211 of the first terminal through an antenna 1216, and an action such as determining or processing performed by the first terminal may be completed by the processor 1211 of the first terminal. For example, the processor 1211 of the first terminal may receive, from an access network device through the antenna 1216, indication information that is sent by the access network device and that is of a first transmission resource used by the first terminal to send data on a sidelink. For example, the processor 1211 of the first terminal may perform a channel access procedure on an unlicensed spectrum. For example, when the processor 1211 of the first terminal determines that a failure occurs in the channel access procedure performed on the unlicensed spectrum, the processor 1211 of the first terminal may send the first information to the access network device through the antenna 1216, where the first information is used to request to allocate a second transmission resource to the sidelink of the unlicensed spectrum. For example, the processor 1211 of the first terminal may obtain a channel access priority class, and then perform the channel access procedure based on the obtained channel access priority class.

In another embodiment, for example, in the method performed by a first terminal in this embodiment of this application, the first terminal may perform the method by using the structure shown in FIG. 7. An action of sending or receiving by the first terminal may be completed by a processor 1211 of the first terminal through an antenna 1216, and an action such as determining or processing performed by the first terminal may be completed by the processor 1211 of the first terminal. For example, the processor 1211 of the first terminal may obtain, through the antenna 1216, a first transmission resource that is sent by an access network device and that is used by the first terminal to send data on a sidelink. For example, the processor 1211 of the first terminal may perform a channel access procedure on an unlicensed spectrum. For example, the processor 1211 of the first terminal may send the data to a second terminal on the sidelink through the antenna 1216 and by using the first transmission resource. For example, the processor 1211 of the first terminal may determine that the second terminal fails to parse a transport block sent by the first terminal on the first transmission resource. For example, the processor 1211 of the first terminal receives, through the antenna 1216, a hybrid automatic repeat request (Hybrid Automatic Repeat reQuest, HARQ) message sent by the second terminal, where the HARQ message includes one or more of the following: identifier information of the first terminal, HARQ process identifier information, carrier identifier information, or transport block size information; and the processor 1211 of the first terminal determines, based on the HARQ message, that the second terminal fails to parse the transport block sent by the first terminal on the first transmission resource. Then, the processor 1211 of the first terminal sends first information to the access network device through the antenna 1216.

In addition, in this embodiment of this application, for each operation in the method performed by the access network device, the access network device has a unit or a module for performing each operation in the method. For each operation in the method performed by the terminal, the terminal has a unit or module for performing each operation in the method. For each operation in the method performed by the terminal, the terminal has a unit or module for performing each operation in the method.

An example in which each function module is obtained through division based on each corresponding function is used below for description.

Figure 15:
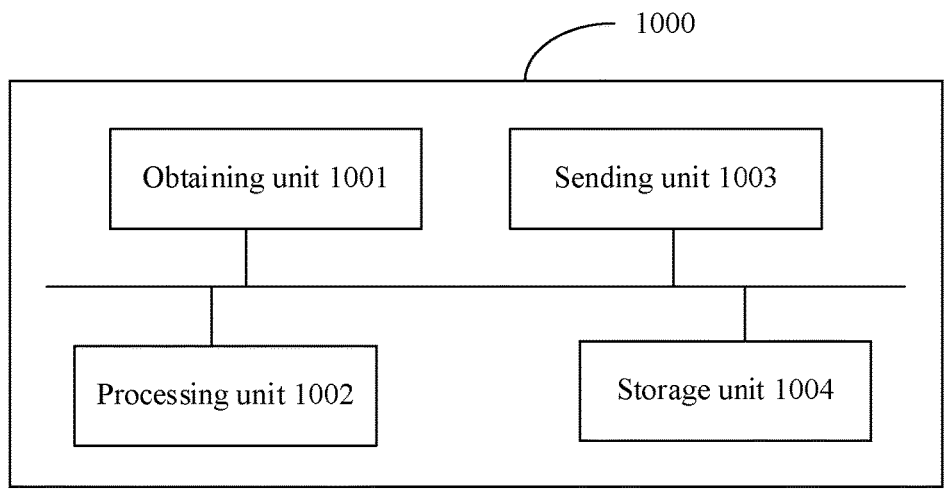
FIG. 15 is a block diagram illustrating a communications apparatus according to an embodiment of this application.

As shown in FIG. 15, FIG. 15 provides a communications apparatus 1000 according to an embodiment of this application. The communications apparatus 1000 includes an obtaining unit 1001, a processing unit 1002, and a sending unit 1003.

In one embodiment, the communications apparatus 1000 further includes a storage unit 1004. The obtaining unit 1001, the processing unit 1002, the sending unit 1003, and the storage unit 1004 are connected through a communications bus. In one embodiment, the communications apparatus may further include a receiving unit.

The sending unit 1003 and the receiving unit may be an apparatus that has a transceiver function, or may be two apparatuses that separately have a sending function and a receiving function; and are configured to communicate with another access network device or communications network.

The storage unit 1004 may include one or more memories. The memory may be a component configured to store a program or data in one or more devices or circuits.

The storage unit 1004 may exist independently, and is connected to the processing unit 1001 through the communications bus. The storage unit 1004 may alternatively be integrated with the processing unit 1002.

The communications apparatus 1000 may be used in a communications device, a circuit, a hardware assembly, or a chip.

The communications apparatus 1000 may be a terminal in the embodiments of this application, for example, a first terminal or a second terminal. A block diagram of the terminal may be shown in FIG. 7. In one embodiment, the sending unit 1003 and the receiving unit of the communications apparatus 1000 may include an antenna and a transceiver of the terminal, for example, the antenna 1216 and the transceiver 1212 in FIG. 7. In one embodiment, the sending unit 1003 and the obtaining unit 1001 may further include an output device and an input device, for example, the output device 1214 and the input device 1215 in FIG. 7.

The communications apparatus 1000 may be a chip in the terminal in the embodiments of this application, for example, a chip in the first terminal. The sending unit 1003 and the receiving unit may be an input or output interface, a pin, a circuit, or the like. The processing unit 1002 and the obtaining unit 1001 may be integrated together as a processor.

In one embodiment, when the communications apparatus includes the storage unit 1004, the storage unit 1004 may be a memory. A computer-executable instruction of the method on a first terminal side may be stored, so that the processor performs the method of the first terminal in the foregoing embodiment. The storage unit 1004 may be a register, a cache, a RAM, or the like, and the storage unit 1004 may be integrated with the processing unit 1002. The storage unit 1004 may be a ROM or another type of static storage device that can store static information and an instruction. The storage unit 1004 may be independent of the processing unit 1002. In one embodiment, with development of wireless communications technologies, a transceiver may be integrated into the communications apparatus 1000. For example, functions of the sending unit 1003 and the receiving unit may be implemented through different arranged function circuits, or may be integrated into a circuit apparatus that has a transceiver function, for example, functions of the sending unit 1003 and the receiving unit are integrated into the transceiver 1212 for implementation.

When the communications apparatus 1000 is the chip in the terminal in this embodiment of this application, the communications apparatus 1000 may implement the method performed by the first terminal in the foregoing embodiment. For example, the obtaining unit 1001 is configured to support the communications apparatus 1000 in performing S102 and S107 in the foregoing embodiment. The processing unit 1002 is configured to support the communications apparatus 1000 in performing S103 in the foregoing embodiment. The sending unit 1003 is configured to support the communications apparatus 1000 in performing S104 in the foregoing embodiment. For other content, refer to related content in FIG. 8 to FIG. 14.

Figure 16:
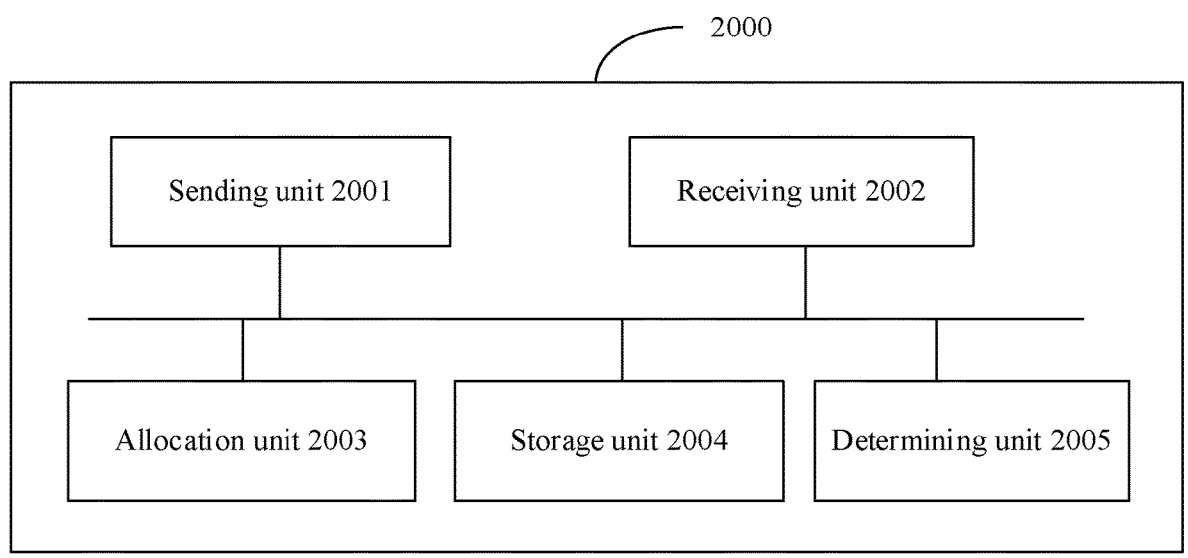
FIG. 16 is a block 1 diagram illustrating a resource allocation apparatus according to an embodiment of this application.

FIG. 16 is a block 1 diagram of a resource allocation apparatus 2000 according to an embodiment of this application. The resource allocation apparatus 2000 may be an access network device in the embodiments of this application, or may be a chip applied to an access network device. A block diagram of the access network device may be shown in FIG. 6.

In an example, the resource allocation apparatus 2000 includes a sending unit 2001, a receiving unit 2002, and an allocation unit 2003. In one embodiment, the resource allocation apparatus 2000 may further include a storage unit 2004 and a determining unit 2005. The determining unit 2005, the sending unit 2001, the receiving unit 2002, the allocation unit 2003, and the storage unit 2004 are connected through a communications bus.

The storage unit 2004 may include one or more memories. The memory may be a component configured to store a program or data in one or more devices or circuits.

In addition, the sending unit 2001 and the receiving unit 2002 may be collectively referred to as a communications unit. In one embodiment, the allocation unit 2003 and the determining unit 2005 are integrated together as a processing unit.

The storage unit 2004 may exist independently, and is connected to the allocation unit 2003 through the communications bus. The storage unit 2004 may alternatively be integrated with the processing unit.

The resource allocation apparatus 2000 may be used in a communications device, a circuit, a hardware assembly, or a chip.

For example, functions of the sending unit 2001 and the receiving unit 2002 may be implemented through different arranged function circuits, or may be integrated into a circuit apparatus that has a transceiver function. For example, functions of the sending unit 2001 and the receiving unit 2002 are integrated into a transceiver for implementation. For example, the sending unit 2001 and the receiving unit 2002 may include an antenna and a transceiver of the access network device, for example, the antenna 1115 and the transceiver 1113 in FIG. 6. The sending unit 2001 and the receiving unit 2002 may further include a network interface of the access network device, for example, the network interface 1114 in FIG. 6.

The resource allocation apparatus 2000 may be a chip in the access network device in the embodiments of this application. The sending unit 2001 and the receiving unit 2002 may be an input or output interface, a pin, a circuit, or the like. The allocation unit 2003 and the determining unit 2005 are integrated together as a processor.

In one embodiment, the storage unit 2004 may store a computer-executable instruction of the method on an access network device side, so that the determining unit 2005 and the allocation unit 2003 perform the method on the access network device side in the foregoing embodiment. The storage unit 2004 may be a register, a cache, a RAM, or the like, and the storage unit 2004 may be integrated with the processing unit. The storage unit 2004 may be a ROM or another type of static storage device that can store static information and an instruction. The storage unit 2004 may be independent of the processing unit. In one embodiment, with development of wireless communications technologies, a transceiver may be integrated into the resource allocation apparatus 2000. For example, the sending unit 2001 and the receiving unit 2002 are integrated into the transceiver 1113 and the network interface 1114.

When the resource allocation apparatus 2000 is an access network device or a chip in an access network device in the embodiments of this application, the method performed by the access network device in the foregoing embodiments can be implemented. The sending unit 2001 may support the resource allocation apparatus 2000 in performing S101 in the foregoing embodiment. The receiving unit 2002 may support the resource allocation apparatus 2000 in performing S105 in the foregoing embodiment. The allocation unit 2003 is configured to support the resource allocation apparatus 2000 in performing S106 in the foregoing embodiment.

Figure 17:
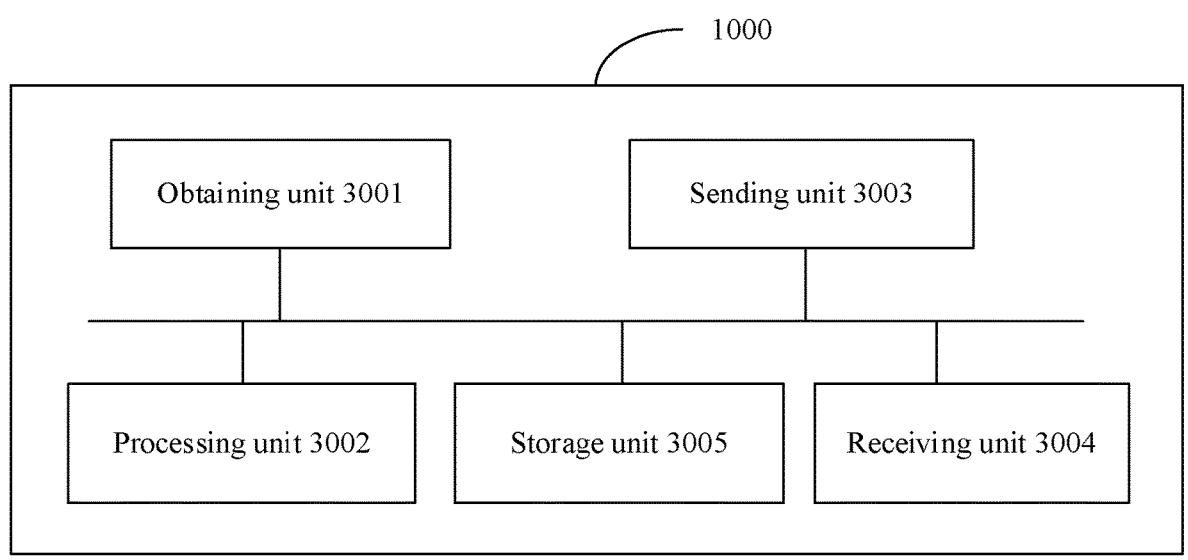
FIG. 17 is a block 1 diagram illustrating another communications apparatus according to an embodiment of this application.

In another example, FIG. 17 is a block diagram of another communications apparatus 1000 according to an embodiment of this application. The communications apparatus 1000 may be a first terminal, or may be a chip in a first terminal. A block diagram of the first terminal may be shown in FIG. 7.

The communications apparatus 1000 includes an obtaining unit 3001, a processing unit 3002, and a sending unit 3003. In one embodiment, the communications apparatus 1000 further includes a receiving unit 3004 and a storage unit 3005.

In one embodiment, the obtaining unit 3001, the processing unit 3002, the sending unit 3003, the receiving unit 3004, and the storage unit 3005 are connected through a communications bus.

The receiving unit 3004 and the sending unit 3003 may be an apparatus that has a transceiver function, for example, may be a communications unit, configured to communicate with another access network device or a communications network. For example, functions of the sending unit 3003 and the receiving unit 3004 may be implemented through different arranged function circuits, or may be integrated into a circuit apparatus that has a transceiver function. For example, functions of the sending unit 3003 and the receiving unit 3004 are integrated into a transceiver for implementation. In addition, the processing unit 3002 and the obtaining unit 3001 may be integrated into an apparatus that has an execution function, for example, a processing unit.

The storage unit 3005 may include one or more memories. The memory may be a component configured to store a program or data in one or more devices or circuits.

The storage unit 3005 may exist independently, and is connected to the processing unit through the communications bus. The storage unit 3005 may alternatively be integrated with the processing unit.

The communications apparatus 1000 may be used in a communications device, a circuit, a hardware assembly, or a chip.

The communications apparatus 1000 may be a terminal in the embodiments of this application, for example, a first terminal or a second terminal. A block diagram of the terminal may be shown in FIG. 7. In one embodiment, the receiving unit 3004 and the sending unit 3003 of the communications apparatus 1000 may include an antenna and a transceiver of the terminal, for example, the antenna 1216 and the transceiver 1212 in FIG. 7. In one embodiment, the obtaining unit 3001 and the processing unit 3002 may be processors. The receiving unit 3004 and the sending unit 3003 may further include an output device and an input device, for example, the output device 1214 and the input device 1215 in FIG. 7.

The communications apparatus 1000 may be a chip in the terminal in the embodiments of this application, for example, a chip in the first terminal. The receiving unit 3004 and the sending unit 3003 may be an input or output interface, a pin, a circuit, or the like. The processing unit 3002 and the obtaining unit 3001 may be processors in a chip.

In one embodiment, when the communications apparatus 1000 further includes the storage unit 3005, the storage unit 3005 may be a memory in a chip. A computer-executable instruction of the method on a first terminal side may be stored, so that the processor performs the method of the first terminal in the foregoing embodiment. The storage unit 3005 may be a register, a cache, a RAM, or the like, and the storage unit 3005 may be integrated with the processing unit. The storage unit 3005 may be a ROM or another type of static storage device that can store static information and an instruction. The storage unit 3005 may be independent of the processing unit. In one embodiment, with development of wireless communications technologies, a transceiver may be integrated into the communications apparatus 1000. For example, the obtaining unit 3001, the receiving unit 3004, and the sending unit 3003 are integrated into the transceiver 1212.

When the communications apparatus 1000 is the chip in the first terminal in this embodiment of this application, the communications apparatus 1000 may implement the method performed by the first terminal in the foregoing embodiment. For example, the obtaining unit 3001 is configured to support the communications apparatus 1000 in performing S202 in the foregoing embodiment. The sending unit 3003 is configured to support the communications apparatus 1000 in performing S203 and S205 in the foregoing embodiment. The sending unit 3002 is configured to support the communications apparatus 1000 in performing S204 in the foregoing embodiment. For other content, refer to related content in FIG. 8 to FIG. 14.

It may be understood that, as another access network device that interacts with FIG. 17, in the resource allocation apparatus shown in FIG. 16, the sending unit 2001 is configured to support the resource allocation apparatus in performing S201, and the receiving unit 2002 is configured to support the resource allocation apparatus in performing S206. The allocation unit 2003 is configured to support the resource allocation apparatus in performing S207.

An embodiment of this application further provides a computer-readable storage medium. The methods described in the foregoing embodiments may be all or partially implemented by using software, hardware, firmware, or any combination thereof. If the methods are implemented in software, the functions, used as one or more instructions or code, may be stored or transmitted in the computer-readable medium. The computer-readable medium may include a computer storage medium and a communications medium, and may further include any medium that can transfer a computer program from one place to another. The storage medium may be any target medium that can be accessed by a computer.

In one embodiment, the computer-readable medium may include a RAM, a ROM, an EEPROM, a CD-ROM or another optical disc storage, a magnetic disk storage or another magnetic storage device, or any other medium that is used to carry or store required program code in a form of an instruction or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and a microwave) are used to transmit software from a website, a server, or another remote source, the coaxial cable, the optical fiber cable, the twisted pair, the DSL or wireless technologies such as infrared, radio, and a microwave are included in a definition of the medium. Magnetic disks and optical discs used in this specification include a compact disk (CD), a laser disk, an optical disc, a digital versatile disc (DVD), a floppy disk, and a Blu-ray disc, where the magnetic disks usually magnetically reproduce data, and the optical discs optically reproduce data by using laser light. The foregoing combination should also be included within the scope of the computer-readable medium.

An embodiment of this application further provides a computer program product. The methods described in the foregoing embodiments may be all or partially implemented by using software, hardware, firmware, or any combination thereof. When the methods are implemented in software, the methods may be all or partially implemented in a form of a computer program product. The computer program product includes one or more computer instructions. When the foregoing computer program instruction is loaded and executed on a computer, the procedures or functions described in the foregoing method embodiments are all or partially generated. The foregoing computer may be a general-purpose computer, a dedicated computer, a computer network, an access network device, user equipment, or another programmable apparatus.

The objectives, technical solutions, and beneficial effects of the present application are further described in detail in the foregoing specific implementations. It should be understood that the foregoing descriptions are merely specific implementations of the present application, but are not intended to limit the protection scope of the present application. Any modification, equivalent replacement, improvement, or the like made based on the technical solutions of the present application shall fall within the protection scope of the present application.

What is claimed is:

1. A communication method, applied for a first terminal, comprising:
receiving indication information of a first transmission resource to be used by the first terminal to send data on a sidelink from an access network device, wherein the sidelink is a wireless communication link between the first terminal and a second terminal, and wherein the first transmission resource is a resource of an unlicensed spectrum;
performing a channel access procedure on the unlicensed spectrum;
determining that a failure occurs in the channel access procedure performed on the unlicensed spectrum by determining that a quantity of times that the failure occurs in the channel access procedure on a channel of one or more channels associated with the unlicensed spectrum is greater than a first threshold; and
sending first information to the access network device when the failure occurs in the channel access procedure performed on the unlicensed spectrum, wherein the first information comprises information about the channel on which the failure occurs in the channel access procedure, wherein after receiving the first information, the access network device determines, based on content of the first information, the unlicensed spectrum on which the failure occurs in the channel access procedure.

2. The communication method according to claim 1, wherein a second transmission resource is associated with information about the unlicensed spectrum; or
wherein the second transmission resource is associated with information about a channel on which the failure occurs in the channel access procedure and the channel is one of one or more channels associated with the unlicensed spectrum.

3. The communication method according to claim 1, wherein the sending the first information to the access network device when the failure occurs in the channel access procedure performed on the unlicensed spectrum comprises:
sending the first information to the access network device by using a communication resource corresponding to the first transmission resource; or sending the first information to the access network device by using a communication resource associated with the channel on which the failure occurs in the channel access procedure of the unlicensed spectrum, when the failure occurs in the channel access procedure performed on the unlicensed spectrum.

4. The communication method according to claim 1, further comprising:
determining that the failure occurs in the channel access procedure performed on one channel of one or more channels associated with the unlicensed spectrum, and determining that the failure occurs in the channel access procedure performed on the unlicensed spectrum.

5. The communication method according to claim 1, wherein the first information comprises at least one of information about the unlicensed spectrum or information about the channel on which the failure occurs in the channel access procedure.

6. An apparatus comprising
a processor; and
a memory coupled to the processor to store instructions, which when executed by the the processor, cause the processor to perform operations, the operations comprising:
obtaining, indication information of a first transmission resource to be used by the apparatus to send data on a sidelink from an access network device, wherein the sidelink is a wireless communication link between the apparatus and a second terminal, and wherein the first transmission resource is a resource of an unlicensed spectrum;
performing, a channel access procedure on the unlicensed spectrum;
determining that a failure occurs in the channel access procedure performed on the unlicensed spectrum by determining that a quantity of times that the failure occurs in the channel access procedure on a channel of one or more channels associated with the unlicensed spectrum is greater than a first threshold; and
sending, first information to the access network device when the failure occurs in the channel access procedure performed on the unlicensed spectrum, wherein the first information comprises information about the channel on which the failure occurs in the channel access procedure, wherein after receiving the first information, the access network device determines, based on content of the first information, the unlicensed spectrum on which the failure occurs in the channel access procedure.

7. The apparatus according to claim 6, wherein a second transmission resource is associated with information about the unlicensed spectrum; or the second transmission resource is associated with information about a channel on which the failure occurs in the channel access procedure and the channel is one of one or more channels associated with the unlicensed spectrum.

8. The apparatus according to claim 6,
wherein the sending, the first information to the access network device when the apparatus determines that the failure occurs in the channel access procedure performed on the unlicensed spectrum comprises:
sending, the first information to the access network device by using a communication resource corresponding to the first transmission resource; or sending, the first information to the access network device by using a communication resource associated with the channel on which the failure occurs in the channel access procedure of the unlicensed spectrum, when the apparatus determines that the failure occurs in the channel access procedure performed on the unlicensed spectrum.

9. The apparatus according to claim 6, wherein the operations further comprise:
determining, the failure occurs in the channel access procedure performed on a channel of one or more channels associated with the unlicensed spectrum, and determining that the failure occurs in the channel access procedure performed on the unlicensed spectrum.

10. The apparatus according to claim 6, wherein the first information comprises at least one of information about the unlicensed spectrum or information about the channel on which the failure occurs in the channel access procedure.

* * * * *